United States Patent
Sakamoto et al.

(10) Patent No.: US 6,693,697 B2
(45) Date of Patent: Feb. 17, 2004

(54) ACTIVE-MATRIX TYPE LIQUID CRYSTAL DISPLAY DEVICE HAVING THICK AND THIN OVERCOAT LAYERS LAYERED OVER A BLACK MATRIX

(75) Inventors: Michiaki Sakamoto, Tokyo (JP); Yuji Yamamoto, Kagoshima (JP); Mamoru Okamoto, Tokyo (JP); Shigeru Kimura, Tokyo (JP); Shinichi Nakata, Kagoshima (JP); Shouichi Kuroha, Tokyo (JP); Masanobu Hidehira, Tokyo (JP); Yoshitaka Horie, Tokyo (JP); Takayuki Ishino, Kagoshima (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 36 days.

(21) Appl. No.: 10/042,144

(22) Filed: Jan. 11, 2002

(65) Prior Publication Data
US 2002/0089615 A1 Jul. 11, 2002

(30) Foreign Application Priority Data
Jan. 11, 2001 (JP) .......................... 2001-004161

(51) Int. Cl.[7] .................. G02F 1/1333; G02F 1/136; G02F 1/1335
(52) U.S. Cl. .................. 349/138; 349/43; 349/106; 349/110
(58) Field of Search .................. 349/106, 110, 349/111, 138, 42, 43

(56) References Cited

U.S. PATENT DOCUMENTS 6,429,916 B1 * 8/2002 Nakata et al. .............. 349/106
6,466,281 B1 * 10/2002 Huang et al. ............... 349/44
2001/0012079 A1 * 8/2001 Yamamoto et al. ......... 349/106
2001/0026344 A1 * 10/2001 Sakamoto ................... 349/141
2002/0140883 A1 * 10/2002 Okamoto et al. ........... 349/110

FOREIGN PATENT DOCUMENTS

| JP | 2-54217 | 2/1990 |
|----|---------|--------|
| JP | 3-237432 | 10/1991 |
| JP | 6-242433 | 9/1994 |
| JP | 8-122824 | 5/1996 |
| JP | 8-179376 | 7/1996 |
| JP | 10-39292 | 2/1998 |
| JP | 2000-13571 | 1/2000 |
| JP | 2000-338525 | 12/2000 |

* cited by examiner

Primary Examiner—Tarifur R. Chowdhury
(74) Attorney, Agent, or Firm—Young & Thompson

(57) ABSTRACT

A liquid crystal display device is made up of a TFT substrate, an opposed substrate and a liquid crystal layer arranged between these substrates, in which the TFT substrate is provided with gate lines, data lines and TFT on its transparent insulative substrate, in addition, a passivation film is provided so as to cover them. A color filter is provided on the passivation film, and a black matrix is provided at corresponding area to above part of the TFT and to above part of the data line on the color filter. In addition, a first overcoat layer with film thickness of degree of 1 to 3 $\mu$m is provided so as to cover the black matrix. Further, a second overcoat layer with film thickness of approximate 0.5 $\mu$m is provided at the whole surface except for a contact hole. Furthermore, a pixel electrode is provided on pixel formation area on the second overcoat layer.

21 Claims, 14 Drawing Sheets

ACTIVE-MATRIX TYPE LIQUID CRYSTAL DISPLAY DEVICE HAVING THICK AND THIN OVERCOAT LAYERS LAYERED OVER A BLACK MATRIX

BACKGROUND OF THE INVENTION

1. Field of the Invention

The present invention relates to an active-matrix type liquid crystal display device and manufacturing method thereof. More particularly, the present invention relates to an active-matrix type liquid crystal display device of CF on TFT structure of forming both a switching element such as TFT (Thin Film Transistor) and so forth and CF (color filter) on the same substrate and its manufacturing method.

2. Description of the Related Art

Recently, development of active-matrix type liquid crystal display device of using thin film transistor and so forth as switching element is advanced. The active-matrix type liquid crystal display device is composed of TFT substrate on which switching element such as thin film transistor and so forth are formed, opposed substrate on which opposed electrode is formed, and liquid crystal put between these substrates. The TFT substrate has thin film transistor consisting of gate electrode, gate insulating film, semiconductor layer, and source/drain electrode, pixel electrode formed in every pixel, passivation film covering them, orientation film, and terminals for connecting external circuit, and so forth. In addition, the opposed substrate has black matrix for interrupting incident light heading toward thin film transistor area and wiring layer, color filter of each color of RGB (Red, Green and Blue) of conducting color display, transparent electrode made from ITO (Indium Tin Oxide) and so forth and orientation film and so forth. Further, spacers for keeping gap between both substrates by predetermined distances are put between both substrates.

About such active-matrix type liquid crystal display device, in order to improve display appearance quality, high precision fine display is required. For that reason, it is necessary to achieve pixel with high density. However, in the liquid crystal display device of structure, in which above described color filter and black matrix are arranged at the side of opposed substrate, since error occurs on position matching between both substrates in assembly process, it is necessary to form color filter and black matrix somewhat largely in anticipation of margin beforehand. For that reason, it is difficult to make rate of area of opening section to area of pixel large, namely it is difficult to make opening rate large, thus it becomes obstruction for the pixel with high density.

Accordingly, in order to improve opening rate while reducing margin of color filter and black matrix, method for forming color filter and black matrix at TFT substrate side of forming switching element such as thin film transistor and so forth, so called CF on TFT is proposed. For instance, Japanese Patent Application Laid-Open No. Hei 2-54217 and Japanese Patent Application Laid-Open No. Hei 3-237432 disclose CF on TFT.

In CF on TFT, since color filter and black matrix are formed on the TFT substrate, it is unnecessary to take into consideration position matching margin between the TFT substrate and the opposed substrate. Accordingly, it is possible to simplify manufacturing process and it is possible to achieve improvement of opening rate of pixel.

However, in CF on TFT, since pixel electrode is formed on color filter, step occurs at pixel electrode while reflecting unevenness of color filter and so forth. Then, disturbance occurs in orientation of liquid crystal caused by the step, so, there is the problem that the step causes defects such as disclination and reverse tilt domain and so forth.

In order to solve the problem, Japanese Patent Application Laid-Open No. Hei 8-122824 discloses method for forming flattened film after conducting patterning of color filter and black matrix in order to fill unevenness of color filter and black matrix. FIG. 1 is a sectional view illustrating configuration of conventional CF on TFT described in Japanese Patent Application Laid-Open No. Hei 8-122824. It should be noted that the Japanese Patent Application Laid-Open No. Hei 8-122824 discloses technique of using polycrystal silicon TFT (p-Si TFT) as switching element, however, in the present specification, for convenience of explanation, explanation is made that channel-etch type amorphous silicon TFT (a-Si TFT) is used as switching element.

As illustrated in FIG. 1, in liquid crystal display device described in the Japanese Patent Application Laid-Open No. Hei 8-122824, a gate electrode 5b is formed on a transparent insulative substrate 4a, and a gate insulator 6 is formed so as to cover the gate electrode 5b. A semiconductor layer 15 is formed so as to overlap a gate electrode 5b with several times over on the gate insulator 6. In addition, a source electrode 8b and a drain electrode 8a separated on the center section of the gate electrode 5b are connected to the semiconductor layer 15 through an ohmic contact layer (not illustrated), thus thin film transistor is formed. Further, a passivation film 9 is formed so as to cover the thin film transistor.

In the liquid crystal display device of CF on TFT structure, a color filter 10 and black matrix 11 are formed on the passivation film 9, and a pixel electrode 14 is formed thereon through the overcoat layer. In the liquid crystal display device illustrated in FIG. 1, in order to flatten step formed by the color filter 10 and the black matrix 11, a flattening film of thick film 24 is provided. For this measure, it is characterized in that the color filter 10 and the black matrix 11 are made to embed completely in the flattening film 24. In addition, a contact hole 19 of penetrating the flattening film 24 and the passivation film 9 is formed, after that, the pixel electrode 14 made of transparent conductive film is formed, and the pixel electrode 14 is connected to the source electrode 8b.

On the other hand, an opposed electrode 16 is formed on surface of the transparent insulative substrate 4b that stands opposite to the transparent insulative substrate 4a. In addition, liquid crystal 3 is filled between the transparent insulative substrate 4a and the transparent insulative substrate 4b.

In formation process of CF on TFT substrate, it becomes necessary to form fine pattern of black matrix with high light shielding characteristic of degree of Optical Density (OD)=3 made of photosensitive resin as light shielding film of thin film transistor. It should be noted that OD is value defined as $OD=-\log_{10}(T1/T0)$ when incident amount of light into black matrix is taken to be T0, and amount of projected light is taken to be T1. In this configuration, when black matrix is made to execute exposure, neighborhood of surface of black matrix is only executed exposure, so there is the problem that adhesion to base section becomes low.

Japanese Patent Application Laid-Open No. 2000-013571 discloses technique for forming fine pattern in such a way as to conduct exposure while providing photoconductive resin black matrix on color filter to be base section. According to this method, even though only surface neighborhood of high-OD black matrix layer is executed exposure, since adhesion is good between color filter to be base section and black matrix layer, it is possible to form fine pattern without separating black matrix from the base section.

However, there are problems indicated below in the above-described conventional technique. According to flattening technique described above, the flattening film 24 is applied so as to cover a step formed at TFT substrate. Generally, film thickness of the black matrix 11 and the color filter 10 is degree of 1 to 2 $\mu$m, thus step of degree of 2 to 3 $\mu$m is created when the black matrix 11 and the color filter 10 are overlapped. Accordingly, when the step is made to cover by the flattening film 24, film thickness of degree of 1.5 times the step becomes necessary, so, film thickness of degree of 3 to 4.5 $\mu$m is necessary as the flattening film 24. As a result, film thickness of the flattening film 24 becomes thick.

When photoconductive type acrylic resin as material of the flattening film 24, in particular, positive type photoconductive acrylic resin is used, since transmittance of light in the neighborhood of wavelength of 400 to 500 nm in this acrylic resin is degree of 95% in every film thickness 1 $\mu$m, transmittance of the whole flattening film 24 with film thickness of 3 $\mu$m becomes degree of 85%. For that reason, problem occurs in which transmittance of light in the liquid crystal display device deteriorates, and/or white balance collapses. Thus, since effective transmittance becomes low caused by thick film of the flattening film 24, step of the color filter 10 and the black matrix 11 is not flattened completely, but disclination created by the step is made to execute light shielding by using black matrix, so, on the contrary, in some cases, effective transmittance becomes high.

On the other hand, when no flattening film 24 is provided completely, the color filter 10 and the black matrix 11 are subjected to swelling by remover and so forth used at patterning process to create release from end section. In addition, if thin film made of acrylic material and so forth identical with the flattening film 24 is made to form on the color filter 10 and the black matrix 11, so that only overcoat layer is made to form thereon, following problems occur. Generally, overcoat layer is applied by using spin coat method. However, since step of the color filter 10 and the black matrix 11 is extremely large, it is next to impossible to apply overcoat layer to area in which the step is large on surface of the color filter 10 and the black matrix 11. For that reason, in process after forming overcoat layer, for instance, in resist exfoliation process in pixel electrode formation process, defect occurs such that black matrix is subjected to swelling to create release from end section.

As described above, as for liquid crystal display device of CF on TFT structure, it is possible to improve opening rate while reducing margin of position matching between TFT substrate and opposed substrate, however, large step occurs caused by color filter and black matrix on surface of TFT substrate. When forming thick flattening film for filling the step, light transmittance of TFT substrate lowers because flattening film absorbs light, thus there is the problem that effect of opening rate improvement is cancelled out.

SUMMARY OF THE INVENTION

It is an object of the present invention to provide an active-matrix type liquid crystal display device of CF on TFT structure and its manufacturing method capable of protecting color filter and black matrix surely without reducing transmittance. In addition, it is another object of the present invention to provide an active-matrix type liquid crystal display device and its manufacturing method capable of obtaining gap between TFT substrate and opposed substrate in high precision and simply without providing spacer specifically.

An active-matrix type liquid crystal display device according to the present invention comprises first and second transparent substrates being arranged opposite to each other, a plurality of gate lines and data lines formed on a surface of the first transparent substrate being in opposite state to the second transparent substrate, in which the gate lines and the data lines cross mutually, a thin film transistor, provided at the surface of the first transparent substrate, in which the gate line is connected to its gate electrode and the data line is connected to its one of source/drain electrode thereof, a color filter which is provided, at least, at pixel area, which is an area surrounded by said gate line and said data line except both transistor formation area on which said thin film transistor is formed and data line formation area on which said data line is formed, an overcoat layer which is provided in such a way as to cover at least end section of both the thin film transistor and the color filter. The overcoat layer comprises a thin film part which is formed, at least, on the pixel area, and a thick film part which is formed on the transistor formation area or formed on both the transistor formation area and the data line formation area, in which film thickness of the thick film part is thicker than film thickness of the thin film part. The active-matrix type liquid crystal display device further comprises a pixel electrode which is provided at the pixel area, in which the pixel electrode is connected to the other of the source/drain electrode, an opposed electrode which is provided at surface of the second transparent substrate being in opposite state to the first transparent substrate, and liquid crystal which is provided between the first transparent substrate and the second transparent substrate.

In the present invention, overcoat layer consists of thin film part and thick film part. Then, the thick film part is arranged at transistor formation area, whereby it is possible to protect surely constituted subject in the transistor formation area, and it is possible to improve transmittance of the light in such a way as to arrange thin film part on pixel area.

In addition, it is possible to obtain large distance between data line and pixel electrode in such a way as to arrange thick film part of the overcoat layer on data formation area. For this configuration, it is possible to reduce coupling capacitance between data line and pixel electrode, so that it is possible to improve display quality.

The overcoat layer may be formed from first overcoat layer and second overcoat layer, in which the thin film part consists of only the second overcoat layer and the thick film part is formed in such a way as to pile the first overcoat layer up the second overcoat layer. Further, the first overcoat layer may have an opening section in the pixel area, the color filter may be formed within the opening section, and the second overcoat layer may be formed on the first overcoat layer and on the color filter.

By this configuration, the color filter and the first overcoat layer are not overlapped with each other, thus it is possible to control creation of step at end section of color filter. As a result, display quality of liquid crystal display device is improved.

The active-matrix type liquid crystal display device may have spacers between convex section which is formed with both the thin film transistor and the thick film part of overcoat layer contained, and the opposed electrode. By this configuration, it is possible to use the first overcoat layer as the spacer while utilizing positively, so that height of columnar spacer of forming thereon can be made to lessen. As a result, it is possible to prevent defect in which columnar spacer collapses, thus it is possible to control gap between the first transparent substrate and the second transparent substrate in high precision and simply.

The convex section formed with both the thin film transistor and the thick film part of overcoat layer contained may come into contact with the opposed electrode. By this configuration, it is possible to eliminate process for forming columnar spacer.

A manufacturing method of active-matrix type liquid crystal display device which according to the present invention, comprises the steps of: forming a plurality of gate lines and data lines crossed mutually on a surface of a first transparent substrate, forming a thin film transistor on the surface, in which its gate electrode is connected to the gate line and one of its source/drain electrode is connected to the data line, forming color filter at least on pixel area, which is an area surrounded by said gate line and said data line except both transistor formation area on which said thin film transistor is formed and data line formation area on which said data line is formed, forming overcoat layer so as to cover at least end section of both the thin film transistor and the color filter in which its thin film part is arranged on at least the pixel area and in which its thick film part whose film thickness is thicker than film thickness of the thin film part is arranged on the transistor formation area or on both the transistor formation area and the data line formation area, forming the pixel electrode connected to the other of the source/drain electrode on the pixel area, forming opposed electrode on surface of a second transparent substrate, arranging the first transparent substrate and the second transparent substrate so that a surface of the first transparent substrate on which the thin film transistor is formed and a surface of the second transparent substrate on which the opposed electrode is formed are opposed each other, and filling liquid crystal between the first transparent substrate and the second transparent substrate.

In addition, the step of forming the overcoat layer may have the steps of forming selectively first overcoat layer, and forming selectively second overcoat layer, in which the step of forming the overcoat layer forms only the second overcoat layer on the thin film part and forms both the first overcoat layer and the second overcoat layer on the thick film part. Further, each of the steps of forming selectively the first overcoat layer and forming selectively the second overcoat layer may have the steps of forming application film while applying application material by using spin application method, and conducting patterning of this application film, in which the viscosity of application material of forming the second overcoat layer is lower than that of application material of forming the first overcoat layer. Or, each of the steps of forming selectively the first overcoat layer and forming selectively the second overcoat layer may have steps of forming application film while applying application material by using spin application method, and conducting patterning of this application film, in which number of spin revolution in step of forming the second overcoat layer increases than number of spin revolution in step of forming the first overcoat layer. By these methods, it is possible to form overcoat layer provided with thick film part and thin film part with simple method.

Further, the step of forming the overcoat layer may have steps of forming application layer, executing exposure of the application layer in such a way that amount of exposure is made to differ in every part, and executing patterning of the application layer in such a way as to remove the application layer selectively while executing development of the application layer and for forming thick film part and thin film part. Furthermore, the step for executing exposure of the application layer in such a way that amount of exposure is made to differ in every part while using masks have light shielding section, half-transmission section, and transmission section. By these methods, it is possible to form overcoat layer provided with thick film part and thin film part by one time execution of application, exposure and development.

Another manufacturing method of active-matrix type liquid crystal display device which comprises the steps of: forming a plurality of gate lines and data lines crossed each other on a surface of a first transparent substrate, forming a thin film transistor on the surface, in which its gate electrode is connected to the gate line and one of its source/drain electrode is connected to the data line, forming first overcoat layer at both transistor formation area on which the thin film transistor is formed and data line formation area on which the data line is formed in an area surrounded by the gate line and the data line, forming color filter at least on pixel area, which is an area surrounded by said gate line and said data line except both transistor formation area on which said thin film transistor is formed and data line formation area on which said data line is formed, forming second overcoat layer so as to cover at least end section of both the thin film transistor and the color filter, forming pixel electrode connected to the other of the source/drain electrode on the pixel area, forming opposed electrode on surface of a second transparent substrate, arranging the first transparent substrate and the second transparent substrate so that a surface of the first transparent substrate on which the thin film transistor is formed and a surface of the second transparent substrate on which the opposed electrode is formed are opposed each other, and filling liquid crystal between the first transparent substrate and the second transparent substrate.

DETAILED DESCRIPTION OF THE PREFERRED EMBODIMENTS

A preferred embodiment of the active-matrix type liquid crystal display device according to the present invention is CF on TFT structure based-liquid crystal display device in which color filter, black matrix formed on TFT-upper layer and data line upper layer and pixel electrode are provided on the TFT substrate on which gate lines, data lines and TFT are formed. Further, thick film first overcoat layer and thin film second overcoat layer are arranged on the black matrix. At this time, only thin film second overcoat layer is arranged on the color filter of display area, whereby, the black matrix is protected surely by thick film first overcoat layer and attenuation of incident light is restrained by thin film second overcoat layer, thus it is possible to scheme improvement of effective transmittance of the light.

About embodiment of the present invention will be described in detail referring to accompanying drawings below.

First Embodiment

Figure 2:
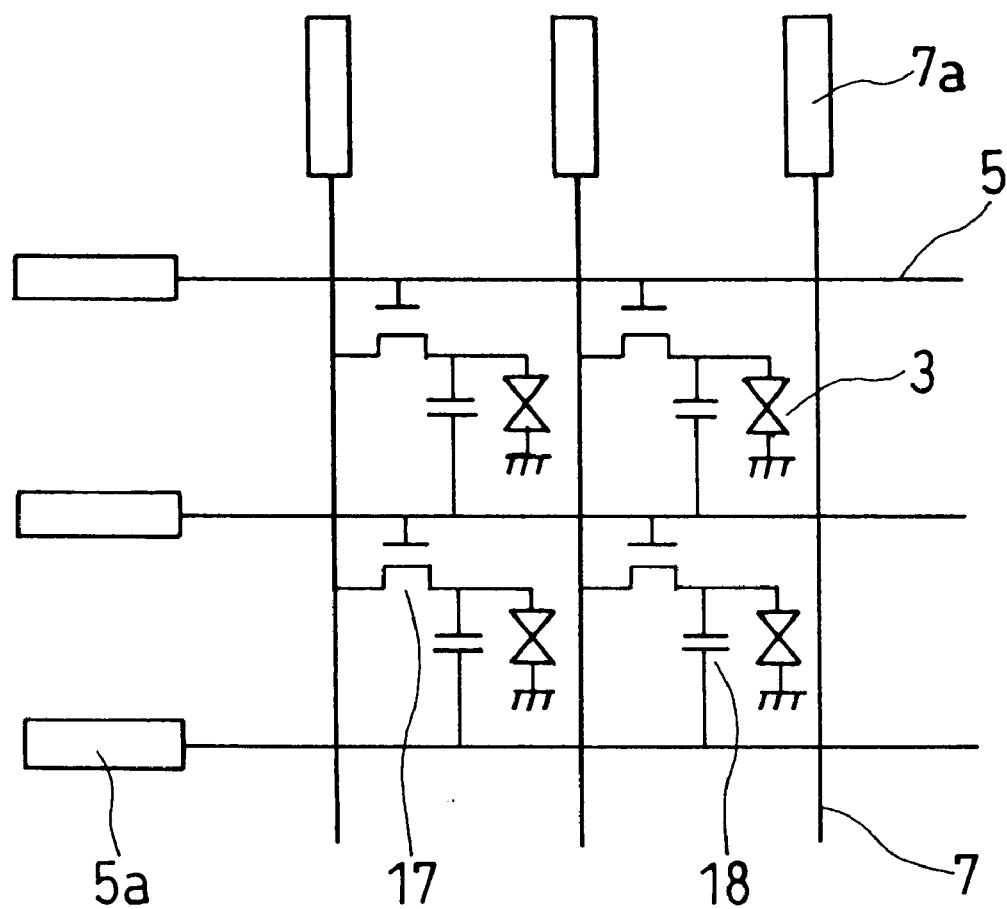
FIG. 2 is a circuit diagram illustrating configuration of liquid crystal display device according to a first embodiment of the present invention.
Figure 3:
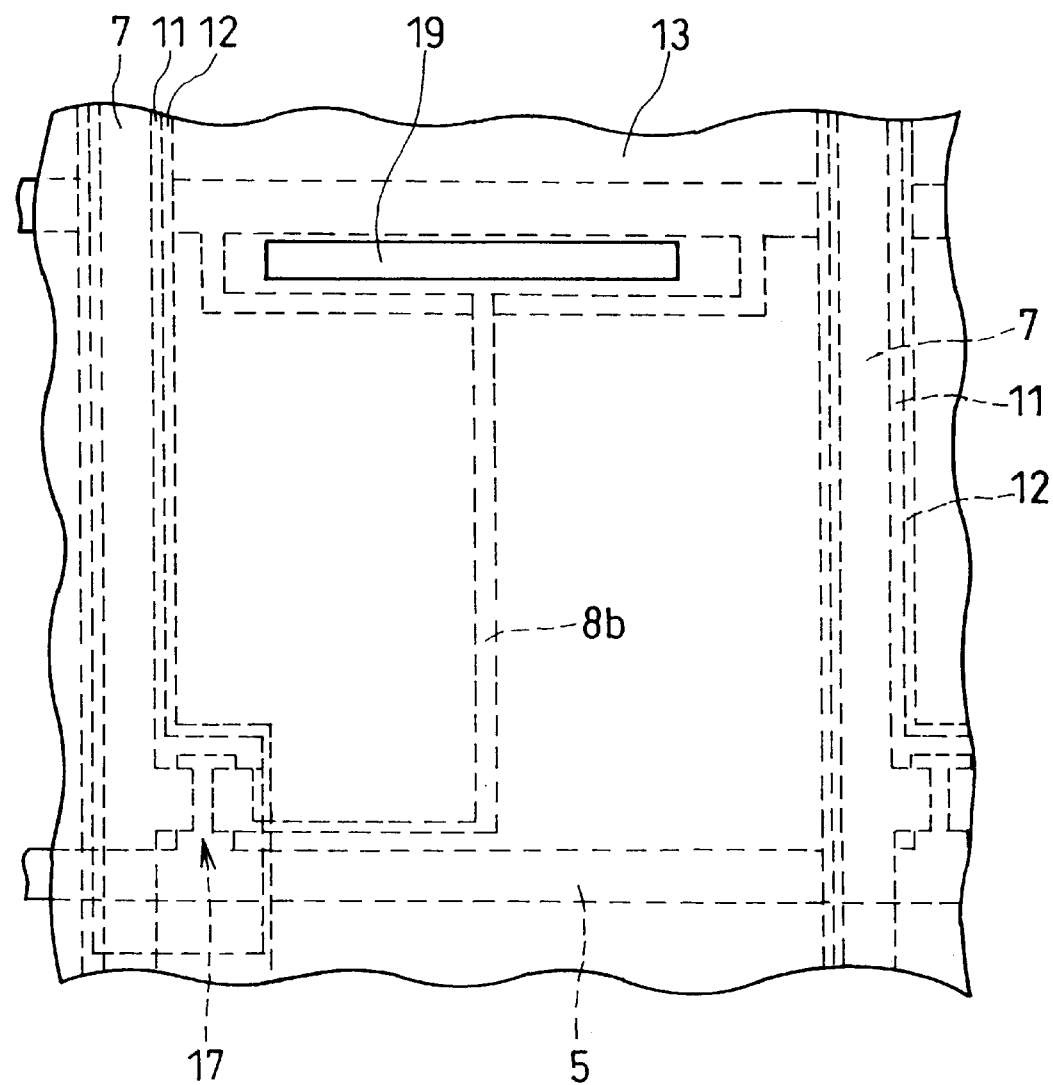
FIG. 3 is a top plan view illustrating typically position relationship among color filter, black matrix and overcoat layer in the present embodiment.
Figure 4:
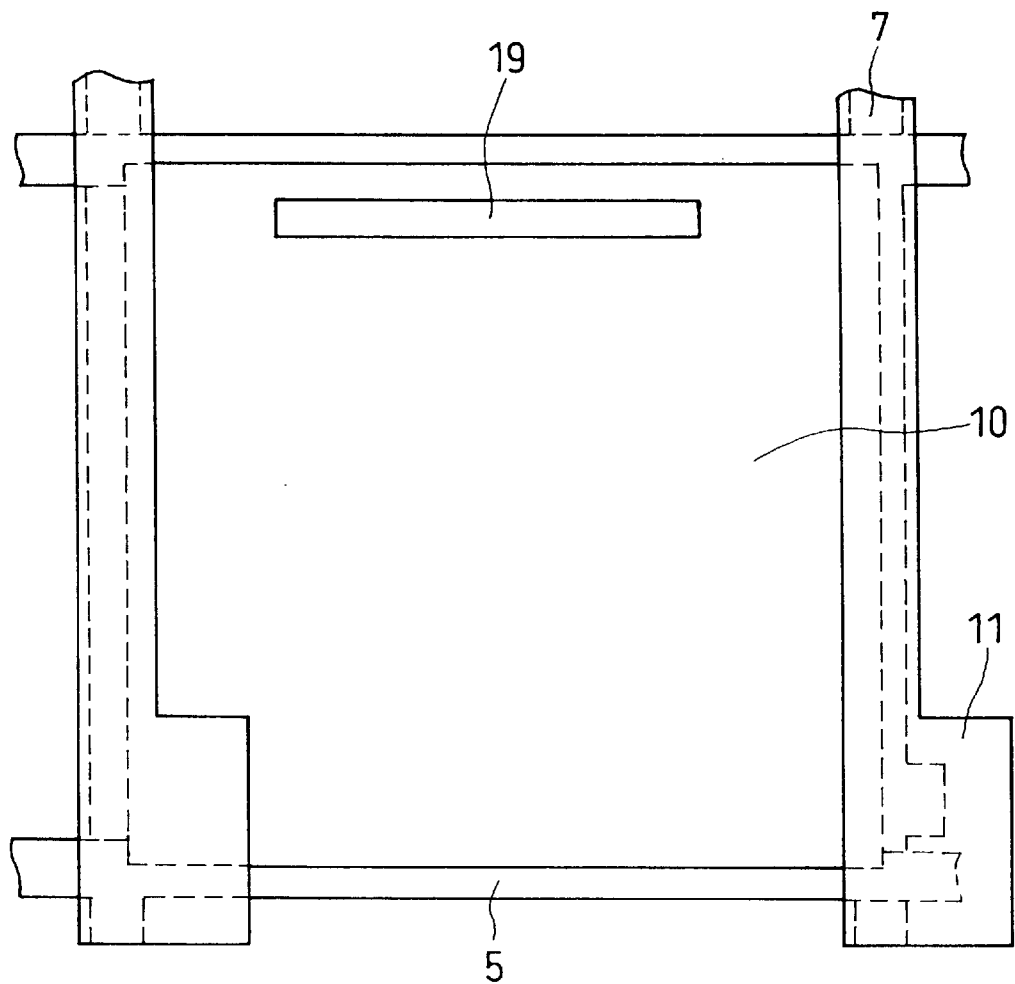
FIG. 4 is a top plan view illustrating typically position relationship among color filter, black matrix and overcoat layer in the present embodiment.
Figure 5:
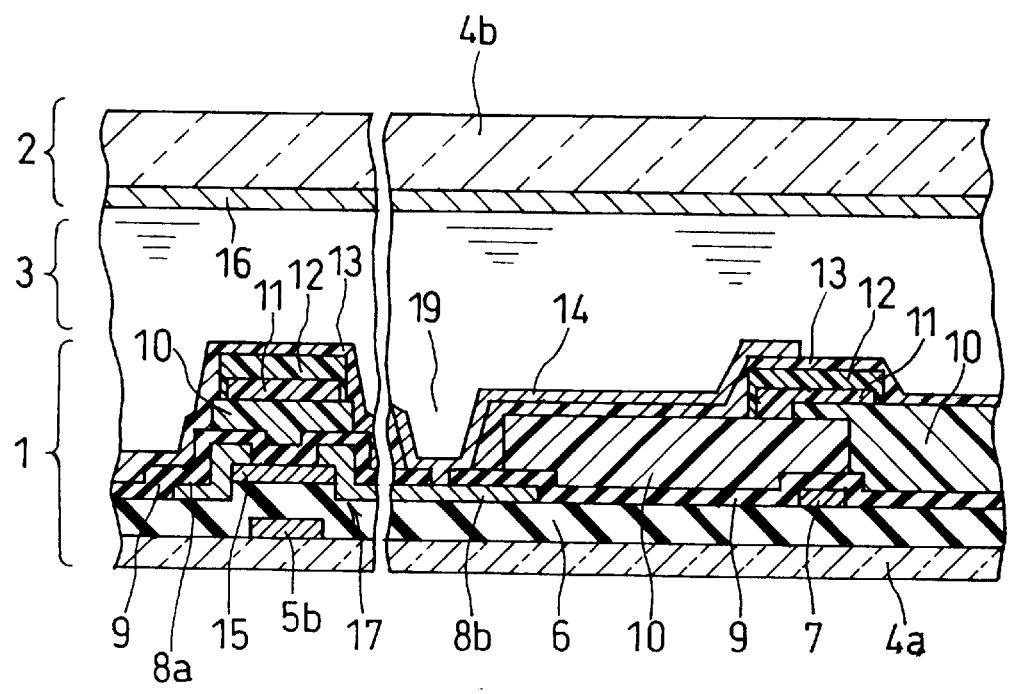
FIG. 5 is a sectional view illustrating structure of liquid crystal display device of the present embodiment.

Firstly, an active-matrix type liquid crystal display device and its manufacturing method according to the first embodiment of the present invention will be described referring to FIG. 2 to FIG. 5 and FIG. 6A to FIG. 6E. FIG. 2 is a circuit diagram illustrating configuration of the liquid crystal display device of the present embodiment, and FIG. 3 and FIG. 4 are top plan views illustrating typically position relationship among the color filter, the black matrix and the overcoat layer that is characteristic part of the present embodiment. In addition, FIG. 5 is a sectional view illustrating structure of the liquid crystal display device of the present embodiment, and FIG. 6A to FIG. 6E are sectional views illustrating manufacturing method of the liquid crystal display device according to the present embodiment in process order.

As illustrated in FIG. 2, in the active-matrix type liquid crystal display device according to the present embodiment, a gate line 5 and a data line 7 are arranged so that the gate line 5 and the data line 7 are at right angles to each other on a transparent insulative substrate (not illustrated). In addition, a TFT 17 is formed so as to correspond to crossing part of these wirings. The gate line 5 is connected to gate electrode of the TFT 17, in which the TFT 17 corresponding to pixel is driven by scanning signal input to gate electrode from the gate line 5. In addition, the data line 7 is connected to drain electrode of the TFT 17, inputting data signal to drain electrode. Further, pixel electrode is connected to source electrode of the TFT 17, and a pixel capacitance 18 is formed by a liquid crystal layer 3 between pixel electrode and opposed electrode formed on opposed substrate. The gate line 5 and the data line 7 are connected to a gate terminal 5a and a data terminal 7a respectively.

Next, position relationship will be described among a color filter 10, black matrix 11, a first overcoat layer 12 and a second overcoat layer 13 in the liquid crystal display device of the present embodiment referring to FIG. 3 and FIG. 4. It should be noted that FIG. 3 and FIG. 4 illustrate configuration of pixel part, however, if respective layers are illustrated in the same drawing, overlap relation becomes obscure, so, position relationship between the gate line 5, the data line 7 and the black matrix 11, the first and the second overcoat layers 12, 13 are described in FIG. 3, while position relationship between the gate line 5, the data line 7 and the color filter 10, the black matrix 11 are described in FIG. 4.

As illustrated in FIG. 3 and FIG. 4, the black matrix 11 is formed on the TFT 17, and the data line 7, in which the black matrix serves role of light shielding of the TFT 17, and light shielding of light leakage of wiring periphery. Then, the first overcoat layer 12 is provided so as to cover black matrix 11, thus protecting the black matrix 11. Further, the second overcoat layer 13 is provided so as to cover the black matrix 11, the color filter 10 and the first overcoat layer 12. It should be noted that pixel electrode (not illustrated) is connected to a source electrode 8b via a contact hole 19 of the second overcoat layer 13.

The first overcoat layer 12 and the second overcoat layer 13 in the present embodiment are not intended to flatten upper surface of TFT substrate, if anything, the first overcoat layer 12 and the second overcoat layer 13 are formed thickly on the black matrix 11 to be a convex section of the TFT substrate, and are formed thinly on the color filter 10. For that reason, since step of the black matrix 11 or the color filter 10 is not flattened by the overcoat layers 12, 13, it is necessary to conceal disclination created caused by disarrangement of orientation of liquid crystal. Accordingly, it is suitable that degree of 2 to 5 μm should be obtained as overlap width between the black matrix 11 and pixel electrodes.

Next, about structure of the active-matrix type liquid crystal display device of the present embodiment will be described referring to FIG. 5. As illustrated in FIG. 5, in a TFT substrate 1 of the present embodiment, a gate electrode 5b is provided on a transparent insulative substrate 4a, and a gate insulator 6 is formed so as to cover them. The gate electrode 5b and a semiconductor layer 15 are provided in such a way as to be overlapped several times over on the gate insulator 6, a source electrode 8b, a drain electrode 8a that are isolated on center section of the semiconductor layer 15 are connected to the semiconductor layer 15 via an ohmic contact layer (not illustrated). In addition, the ohmic contact layer between the source electrode 8b and the drain electrode 8a is removed by etching to provide channel section. Thus, the TFT 17 is formed. Further, a passivation film 9 is formed so as to cover the TFT 17, and the color filter 10 of respective colors RGB is arranged at display area of respective pixels on the passivation film 9 and TFT area. Further, the black matrix 11 for light shielding is formed on the semiconductor layer 15 within TFT area and on the data line 7.

In addition, on the black matrix 11, the thick film first overcoat layer 12 for covering the black matrix 11 is provided along outer shape of the black matrix 11. The first overcoat layer 12 is formed in order to cover part where is not covered by the second overcoat layer 13 described later, and film thickness thereof is suitable to be, for instance, degree of 1 to 3 μm in which film thickness is one capable of covering the black matrix 11. Or, as indicated in the second embodiment described later, in cases where gap between substrates is made to adjust by using the first overcoat layer 12, it is suitable to form the first overcoat layer 12 more thickly.

In addition, the second overcoat layer 13 of thin film is provided so as to cover the first overcoat layer 12 provided on the color filter 10 and the black matrix 11, thus the color filter 10 is protected. Film thickness of the second overcoat layer 13 is suitable to be thin in order to control lowering of transmittance of the color filter 10, thus for instance, film thickness is preferable to be approximately 0.5 μm.

The contact hole 19 that reaches to the source electrode 8b is formed on the second overcoat layer 13 and the passivation film 9. In addition, a pixel electrode 14 made from transparent conductive material such as ITO and so forth is formed on the second overcoat layer 13. When the TFT 17 is used as switching element, the source electrode 8b serves as pullout electrode for connection to the pixel electrode 14, and the pixel electrode 14 is connected to the source electrode 8b through the contact hole 19. In addition, the color filter 10 of respective color layers of R, G, B is provided at part corresponding to pixel display area on the passivation film 9, however, the color filter 10 is not formed at periphery of the contact hole 19.

Thus, the TFT substrate 1 is composed of the transparent insulative substrate 4a, the data line 7, the TFT 17, the passivation film 9, the color filter 10, the black matrix 11, the first overcoat layer 12 and the second overcoat layer 13. Further, the transparent insulative substrate 4b is provided opposite to surface on which the TFT 17 is formed in transparent insulative substrate 4a. An opposed electrode 16 is formed on surface that stands opposite to the TFT substrate 1 of the transparent insulative substrate 4b. An opposed substrate 2 is formed by using the transparent insulative substrate 4b and the opposed electrode 16. Then, a liquid crystal layer 3 is provided between the TFT substrate 1 and the opposed substrate 2. The liquid crystal display device according to the present embodiment is formed by using the TFT substrate 1, the opposed substrate 2 and the liquid crystal layer 3.

It should be noted that, as illustrated in FIG. 5, in the liquid crystal display device of the present embodiment, the color filter 10 is formed on also TFT formation area, in order to enhance adhesion of the black matrix 11, if adhesion between the black matrix 11 and the passivation film 9 is made to enhance by measure of HMDS processing and so forth, it is possible to remove the color filter 10 between the black matrix 11 and the TFT 17. In addition, in FIG. 5, the black matrix 11 is also formed on the data line 7. The black matrix 11 prevents incidence of the light into area in which orientation direction is disturbed caused by influence of electric potential of the data line 7, thus it is possible to improve display quality. However, it is not necessarily provide the black matrix 11 on the data line 7.

Figure 6A:
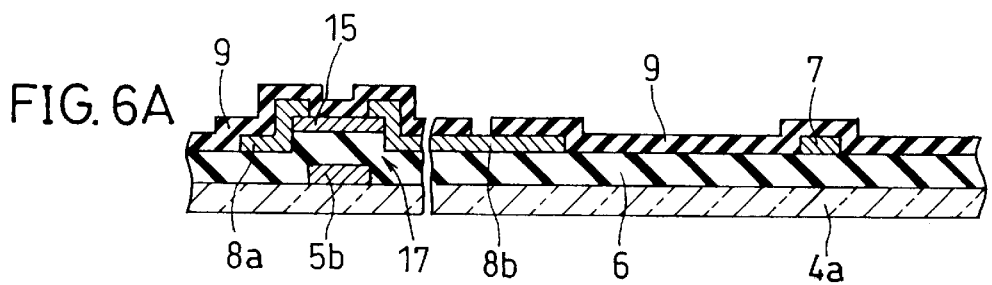
FIG. 6A to FIG. 6E are sectional views illustrating manufacturing method of liquid crystal display device according to the present embodiment in connection with its process order.

Next, manufacturing method of the above TFT substrate 1 will be described referring to FIG. 6A to FIG. 6E. Firstly, as illustrated in FIG. 6A, channel-etch type TFT is formed on the transparent insulative substrate 4a. Specifically, thin film with film thickness of degree of 100 to 400 nm is made to form on the transparent insulative substrate 4a made from glass and so forth by using sputtering method and so forth with metal such as aluminum (Al), molybdenum (Mo) or chromium (Cr) or so forth as material. Then, thin film is subjected to patterning by known photolithography method to form required shape in order to form the gate electrode 5b and the gate line 5.

Next, on the gate electrode 5b and the transparent insulative substrate 4, the gate insulator 6 is formed in such a way as to form an insulating film such as silicon oxide film, silicon nitride film or laminated film thereof or so forth with film thickness of degree of 100 to 200 nm by using CVD method and so forth. Next, amorphous silicon film is made to form so that film thickness becomes degree of 400 nm by using CVD method and so forth, then the semiconductor layer 15 is formed while being subjected to patterning this film into required shape. In addition, thin film whose film thickness is degree of 100 to 400 nm is formed with metal such as Al, Mo, Cr and so forth as material by using sputtering method and so forth. In addition, the source electrode 8b and the drain electrode 8a are formed in such a way that thin film is subjected to patterning into required electrode shape by using photolithography method. At this time, channel section is formed while removing unnecessary ohmic contact layer between the source electrode 8b and the drain electrode 8a. Thus, the TFT 17 is formed.

Further, the passivation film 9 such as silicon nitride film and so forth is made to deposit so as to cover the TFT 17 with film thickness of degree of 100 to 200 nm. After that, the contact hole is formed in order to connect the pixel electrode 14 to the source electrode 8b while executing patterning of this passivation film 9. It should be noted that it is possible to use as material for the passivation film 9, except for inorganic material such as silicon nitride and so forth, transparent resin material such as epoxy resin, acrylic resin and so forth.

Figure 6B:
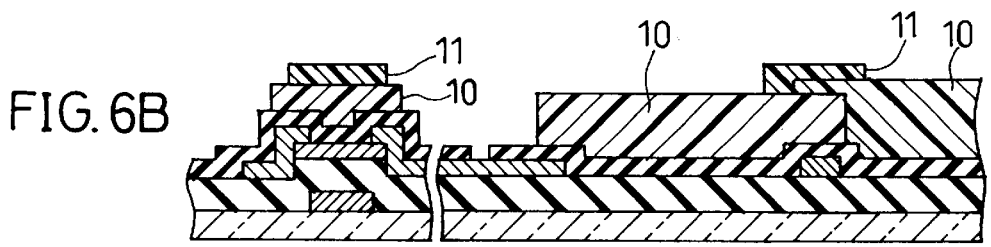

Next, as illustrated in FIG. 6B, the color filter 10 and the black matrix 11 are formed on the passivation film 9. First, negative type photo-curing color resist of scattering red pigment into acrylic resin is made to apply on substrate by using spin coat method. At this time, number of spin revolution is made to adjust so that coating film thickness becomes degree of 1.6 μm. Next, pre-bake in which temperature is 80 degrees and time is 2 minutes is executed by using hot plate. Then, color resist is made to expose, before removing color resist selectively while developing color resist by using liquid solution of TMAH (Tetra Methyl Ammonium Hydro-oxide) with density of 0.04 mass %, in order to execute patterning into required shape. After that, color resist is made to execute baking of condition that temperature is 230 degrees, time is 1 hour, to form a red color filter 10. Similarly, a green color filter 10 and a blue color filter 10 are formed. At this time, the red color filter, the green color filter and the blue color filter are formed at different positions mutually in the passivation film 9, however, it is also good that end section of respective color filters may be overlapped mutually.

After that, the black matrix 11 is formed at an area of the TFT 17 on the color filter 10 and at a corresponding area to above part of the data line 7 in the same way as the color filter 10.

Figure 6C:
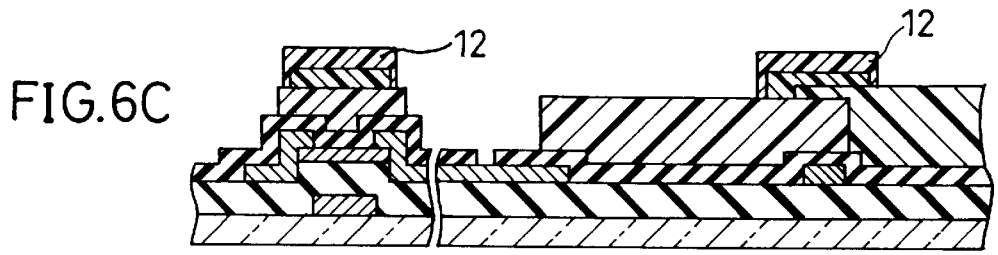

Next, as illustrated in FIG. 6C, the first overcoat layer 12 of thick film is formed so as to cover the black matrix 11. According to the configuration, it is possible to protect surface of the black matrix 11. Formation of the first overcoat layer 12 is that for instance, acrylic positive type photosensitive resin of viscosity: approximate 15 cp is applied by spin coat method with number of revolution 800 rpm/10 s on the color filter 10 and the black matrix 11. After that, the first overcoat layer 12 is made to develop by using liquid solution of TMAH (Tetra Methyl Ammonium Hydrooxide) with density of 0.4 mass %, in order to execute patterning into required shape, then, the first overcoat layer 12 is made to execute baking of condition that temperature is 220 degrees, time is 1 hour. For this operation, the first overcoat layer 12 is formed on the black matrix 11 with film thickness of degree of 1 µm.

Figure 6D:
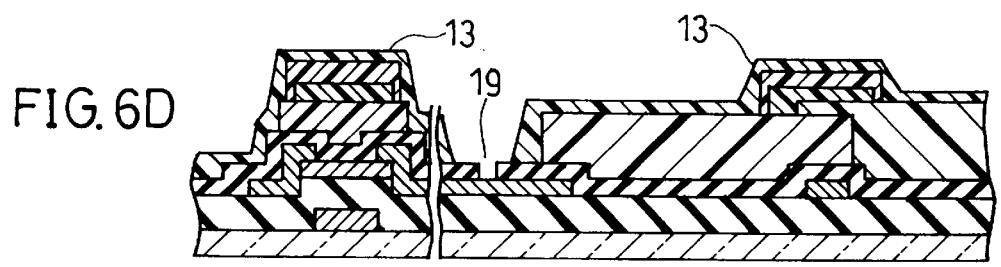

Continuously, as illustrated in FIG. 6D, the second overcoat layer 13 of thin film is formed in order to protect the color filter 10. Formation of the second overcoat layer 13 is that for instance, acrylic positive type photosensitive resin of viscosity: approximate 5 cp is applied by spin coat method with number of revolution 1000 rpm/10 s. After that, the second overcoat layer 13 is made to develop by using liquid solution of TMAH (Tetra Methyl Ammonium Hydro-oxide) with density of 0.4 mass %, in order to execute patterning into required shape. On this occasion, opening is formed at part corresponding to over contact hole formed at the passivation film 9 in the second overcoat layer 13 so as to form the contact hole 19 for connecting the pixel electrode 14 to the source electrode 8b.

After that, in order to make positive type photoconductive resin transparent, optical cross-linkage is made to execute in such a way as to conduct all-surface exposure with illuminance of degree of 4 to 8J using g h i combined UV light, so that it causes the second overcoat layer 13 to be transparent. After that, the second overcoat layer 13 is made to execute baking of condition that temperature is 220 degrees, time is 1 hour. For this processing, film thickness of the second overcoat layer 13 formed on the color filter 10 becomes degree of 0.5 µm to 1.5 µm.

It should be noted that, in the present embodiment, on the occasion of forming the first overcoat layer 12 and the second overcoat layer 13, in order to obtain different film thickness, positive type photoconductive resins whose viscosities are different with each other are used, and the number of revolution of spin application is made to change. However, on the occasion of forming the first overcoat layer 12 and the second overcoat layer 13, it is possible to change film thickness while changing only the number of revolution of spin application using photoconductive resin with equal viscosities. In addition, in the present embodiment, the first overcoat layer 12 of thick film is formed before the second overcoat layer 13 of thin film is formed, however it is preferable to form the overcoat layer of thin film previously, before forming the overcoat layer of thick film while reversing the order. Further, in the present embodiment, the contact hole of the passivation film 9 is formed before the contact hole of the second overcoat layer 13 is formed, however, it is also possible to form the contact hole of the second overcoat layer 13, before executing patterning of the contact hole of passivation film 9 while reversing the order.

Figure 6E:
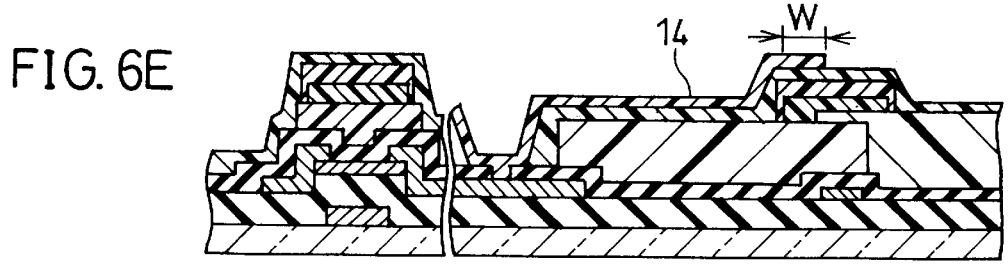

Then, as illustrated in FIG. 6E, the pixel electrode 14 is formed in such a way as to form transparent conductive film of ITO and so forth by using Sputtering method and so forth to execute patterning. At this time, the more the film thickness of the pixel electrode 14 is thick, the more appropriate coverage is obtained, so, in order to keep transparency of ITO, degree of 40 to 100 nm of film thickness is appropriate. In addition, at this time, overlap-width W between the black matrix 11 and the pixel electrode 14 is taken to be 2 to 5 µm.

After that, following general method, orientation film is formed on the TFT substrate 1 and the opposed substrate 2 on which the opposed electrode 16 such as ITO and so forth are arranged, after that, both substrates are made to overlap, before injecting liquid crystal to form liquid crystal display device of CF on TFT structure.

As described above, in the liquid crystal display device of CF on TFT structure in which both the color filter 10 and the black matrix 11 are formed on the TFT substrate 1, step of the substrates becomes large caused by the color filter 10 and the black matrix 11, so, it becomes difficult to cover the overcoat layer on the step. For that reason, it becomes difficult to protect the black matrix sufficiently. When attempt is made to cover the overcoat layer on the step sufficiently, it is necessary to provide thick overcoat layer, namely, it is necessary to provide flattened film, with the result that transmittance of the light deteriorates. However, in the present embodiment, the first overcoat layer 12 of thick film with large viscosity is provided on the black matrix 11, and the second overcoat layer 13 of thin film with small viscosity is formed on the color filter 10, whereby, surface of the black matrix 11 is made to coat and protect sufficiently, and it is possible to control lowering of transmittance of incident light into the color filter 10 while making the overcoat layer on the color filter 10 thin.

Figure 1:
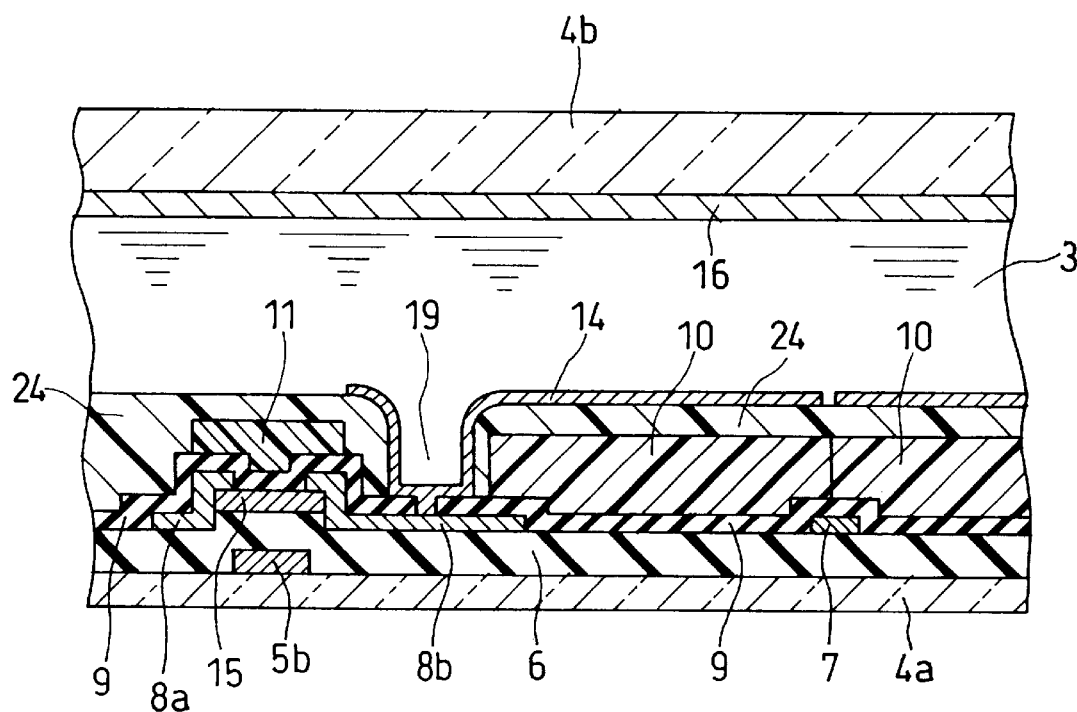
FIG. 1 is a sectional view illustrating configuration of conventional CF on TFT described in Japanese Patent Application Laid-Open No. Hei 8-122824.

Specifically, in the liquid crystal display device which is formed in such a method of the present embodiment, transmittance of the substrate becomes degree of 97% at wavelength of 400 to 450 nm. In the liquid crystal display device provided with the conventional flattened film 24 illustrated in FIG. 1, transmittance of the light is approximate 85%, therefore, the liquid crystal display device of the present embodiment is capable of improving transmittance remarkably in comparison with the conventional liquid crystal display device.

It should be noted that, in the present embodiment, the first overcoat layer 12 on the black matrix 11 is formed thickly by the sacrifice of flatness, accordingly, in order to prevent disclination caused by unevenness of the pixel electrode 14 formed thereon, overlap-width W between the black matrix 11 and the pixel electrode 14 is taken to be 2 to 5 µm. On the contrary, when surface of TFT substrate is made to flatten completely while providing conventional flattened film, it is good that overlap-width W is degree of 1.5 µm. Thus, in the present embodiment, since overlap-width W is made wide in comparison with the conventional method, opening rate of the liquid crystal display device becomes small. However, since transmittance is improved, practical transmittance of panel becomes larger than that of the liquid crystal display device of the flattened structure.

In addition, in the liquid crystal display device of the present embodiment, the first overcoat layer 12 of thick film is formed on the data line 7, whereby, distance between the data line 7 and the pixel electrode 14 can be made large, for that reason, it is possible to reduce coupling capacitance between the data line 7 and the pixel electrode 14 to improve display quality.

It should be noted that, in the present embodiment, explanation was made about example in which the first and the second overcoat layers 12, 13 are formed in such a way as to use acrylic positive type photoconductive resin with spin coat method. However, the first and the second overcoat layers 12, 13 are not limited to the above-described material, so, it is appropriate that, as for material of the first overcoat layer 12, material is one in which adjustment of viscosity is easy and pattern formation is possible, and as for material of the second overcoat layer 13, material with further high transmittance is appropriate, further, it is good that different materials with each other are used for respective layers. In addition, formation method is not limited to application method, for instance, it is appropriate that insulating film and so forth are formed by using sputtering method and/or CVD method and so forth.

In addition, the present invention is capable of being applied to the liquid crystal display device in which connection between the pixel electrode and the switching element is executed while penetrating the color filter 10 and the black matrix 11, as for the switching element, there is no limitation, it is not apply only to the TFT, but it is suitable to be MIM, diode and so forth, in addition, the TFT is suitable to be reverse stagger-forward stagger type a-Si TFT and/or planer type p-Si TFT.

In addition, in the liquid crystal display device of the present invention, there is no specific limitation except for the above-described configuration, thus, for instance, for the sake of liquid crystal material, orientation film, opposed substrate, opposed electrode and so forth, it is appropriate to use general materials for the active-matrix type liquid crystal display device. Further, respective color filters are generally constituted by three colors of red (R), green (G) and blue (B) for full colors display, however, the present invention is not limited by this method, thus it is possible to change appropriately.

Second Embodiment

Figure 7:
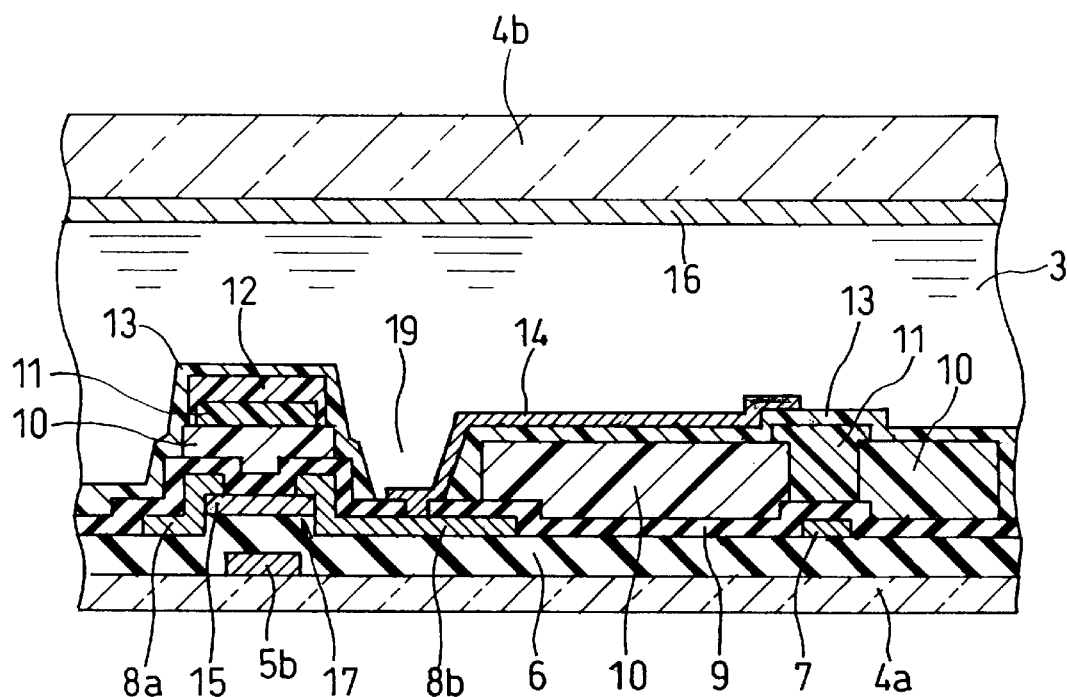
FIG. 7 is a sectional view illustrating structure of liquid crystal display device of a second embodiment of the present invention.

Next, an active-matrix type liquid crystal display device and its manufacturing method according to the second embodiment of the present invention will be described referring to FIG. 7. FIG. 7 is a sectional view illustrating structure of the liquid crystal display device of the present embodiment. The present embodiment is characterized in that step on data line is made to reduce in such a way as to embed the black matrix on the data line in the color filter to eliminate the first overcoat layer on the data line. As for structure and manufacturing method of part except for the above matter, they are the same as the structure and manufacturing method of the above-described first embodiment.

It should be noted that, in FIG. 7, the same signs are added to the same element as that of the liquid crystal display device according to the first embodiment illustrated in FIG. 2 to FIG. 6E to eliminate detailed explanation. Provided element to which the same sign as that illustrated in FIG. 2 to FIG. 6E and which is illustrated in FIG. 7 possesses the same essential function, however, it does not mean that the shape and arrangement position are entirely identical therewith. For instance, the black matrix 11 illustrated in FIG. 5 and the black matrix 11 illustrated in FIG. 7 have common essential function of executing light shielding and have common material for forming the black matrix itself, however, shape and arrangement position are different from with each other.

As illustrated in FIG. 7, the TFT substrate of the present embodiment forms the gate electrode 5b and the gate insulator 6 on the transparent insulative substrate 4, and the semiconductor layer 15 is provided so as to be overlapped on the gate electrode 5b with several times over thereon. Then, the TFT 17 is formed in such a way that the source electrode 8b is connected to the semiconductor layer 15, and the drain electrode 8a is connected to the semiconductor layer 15 via ohmic contact layer. Further, the passivation film 9 is provided so as to cover the TFT 17.

In addition, the color filter 10 of respective colors of R, G, B is provided on the passivation film 9 at its corresponding part to pixel display area, and the black matrix 11 for light shielding is provided thereon. In the first embodiment described-above, in order to improve adhesion, the black matrix 11 is provided on the color filter 10, however, in the present embodiment, gap is provided between adjacent the color filters 10, the black matrix 11 is embedded in gap.

Then, in the first embodiment, the first overcoat layer 12 of thick film is provided in order to cover the black matrix 11, however, in the present embodiment, since the black matrix 11 on the data line 7 is embedded in the color filter 10, step is small, thus it is not necessary to provide the first overcoat layer 12 on this part. In addition, the second overcoat layer 13 of thin film is provided so as to cover the first overcoat layer 12 provided on the color filter 10 and the black matrix 11.

In the present embodiment, following effect can be obtained in addition to the effect of the above-described first embodiment. In the liquid crystal display device of the present embodiment, since large step (0.5 to 1 $\mu$m) is formed on the TFT 17, the first overcoat layer 12 for protecting the black matrix 11 formed on the color filter 10, however, since step on the data line 7 is small: 0.1 to 0.2 $\mu$m, it is possible to eliminate the first overcoat layer 12.

Further, since the first overcoat layer 12 of the data line 7 is eliminated, the step in the neighborhood of the above data line 7 in surface of the TFT substrate 1 becomes small. For this configuration, buildup of the pixel electrode 14 in above part of the data line 7 is prevented, so that it is possible to control creation of disclination and so forth. Further, for this configuration, it is possible to minimize overlap-width between the black matrix 11 and the pixel electrode 14, thus, it is possible to make opening rate large than the above-described first embodiment. In addition, since the step caused by the black matrix 11 in end section of the color filter 10 becomes small, standing liquid is difficult to occur on the occasion of forming the second overcoat layer 13, thus it is possible to form the second overcoat layer 13 on the color filter 10 with thin and even condition.

Third Embodiment

Figure 8:
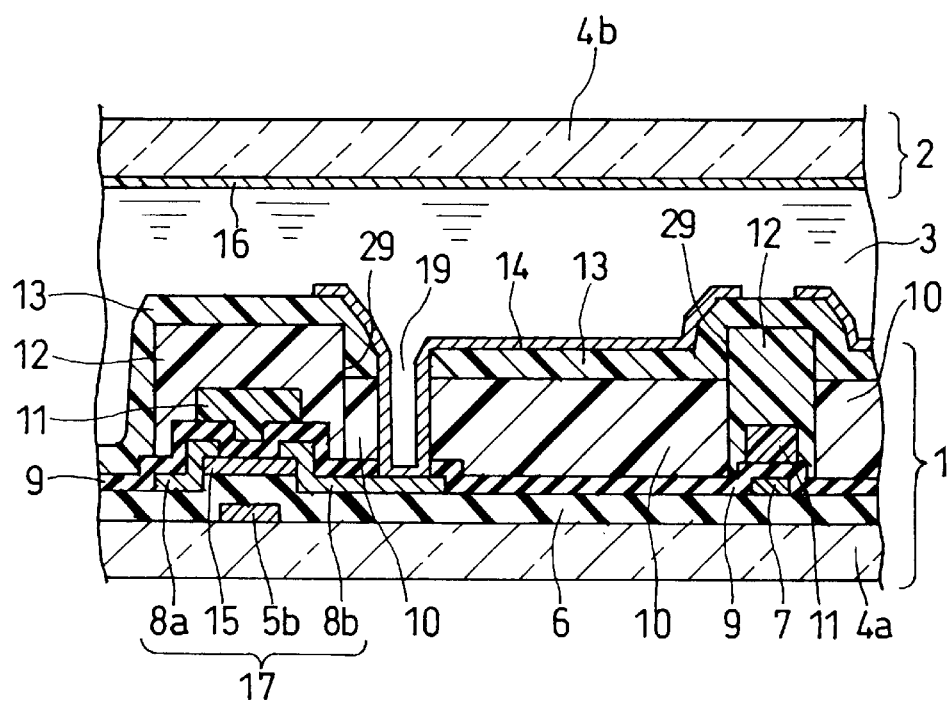
FIG. 8 is a sectional view illustrating structure of liquid crystal display device of a third embodiment of the present invention.

Next, an active-matrix type liquid crystal display device and its manufacturing method according to the third embodiment of the present invention will be described referring to FIG. 8. FIG. 8 is a sectional view illustrating structure of the liquid crystal display device of the present embodiment. In the present embodiment, a technique of arranging black matrix on data line between color filters is the same as that of the above-described second embodiment, however, the present embodiment is characterized in that the first overcoat layer is formed before color filter is formed and shape of color filter is shaped depending on shape of opening section of the first overcoat layer, and the second overcoat layer is formed thereon. Accordingly, as for structure and manufacturing method except for black matrix, color filter, the first overcoat layer and the second overcoat layer, these are the same as those of the above-described first embodiment.

As illustrated in FIG. 8, in the TFT substrate of the present embodiment, the gate electrode 5b and the gate insulator 6 are formed on the transparent insulative substrate 4a, and the gate electrode 5b and the semiconductor layer 15 are provided in such a way as to be overlapped with several times over on the gate insulator 6, thus, the TFT 17 is formed in such a way that the source electrode 8b and the drain electrode 8a are connected to the semiconductor layer 15 via the ohmic contact layer. In addition, the data line 7 is formed on the gate insulator 6. Further, the passivation film 9 is provided so as to cover the TFT 17 and the data line 7. The black matrix 11 is provided at corresponding area to an above part of the semiconductor layer 15 and an above part of the data line 7 on the passivation film 9, and the first overcoat layer 12 is formed so as to cover the black matrix 11. Opening section is formed at the first overcoat layer 12.

In addition, the color filter 10 is formed at part of opening section of the first overcoat layer 12 on the passivation film 9. For that reason, shape of the color filter 10 is specified by the shape of opening section of the first overcoat layer 12. Further, the second overcoat layer 13 is formed so as to cover the passivation film 9, the color filter 10 and the first overcoat layer 12. Furthermore, the contact hole 19 is formed at the passivation film 9, the color filter 10 and the second overcoat layer 13 so as to reach the source electrode 8b. Furthermore, the pixel electrode 14 is formed on the second overcoat layer 13, and the pixel electrode 14 is connected to the source electrode 8b via the contact hole 19. In the present embodiment, photoconductive acrylic resin is used as material of the first overcoat layer 12 and the second overcoat layer 13. In addition, the drain electrode 8a serves as signal electrode.

In the present embodiment, total of film thickness of the overcoat layers formed on the drain electrode 8a becomes sum between the first overcoat layer 12 and the second overcoat layer 13. For that reason, it is possible to maintain distance between the drain electrode 8a and the pixel electrode 14 as distance in which both do not affect with each other. In addition, since the overcoat layer on the color filter 10 is formed by only the second overcoat layer 13, it is possible to maintain sufficient transmittance while controlling deterioration of back light at the time of action.

Manufacturing method of CF on TFT substrate of the present embodiment will be described. By the same method as the first embodiment described-above, the gate electrode 5b, the gate insulator 6, the semiconductor layer 15, the drain electrode 8a, the source electrode 8b and the passivation film 9 are formed on the transparent insulative substrate 4a. Next, the black matrix 11 is formed at corresponding area to above part of the TFT 17 and above part of the data line 7 on the passivation film 9. After that, the first overcoat layer 12 is formed so as to cover the black matrix 11 by using photo resist method. Photoconductive type resist made of acrylic resin and so forth is used as overcoat material that is used at this time. Photoconductive type resist is made to apply by using application method of being obtained even film thickness such as spin coat method or printing method or so forth, subsequently, to conduct exposure, to conduct development, to conduct patterning and to conduct baking to form the first overcoat layer 12. At this time, an opening section 29 is formed in order to accommodate the color filter of being formed at next process at the first overcoat layer 12. In addition, the first overcoat layer 12 is formed with thickness of several μm depending on its dielectric constant.

Next, photoconductive acrylic resin resist is made to apply on surface of substrate by printing method, continuously, to conduct exposure, to conduct development and to conduct baking, whereby, the color filter 10 is made to embed in the opening section 29 of the first overcoat layer 12 that is formed at previous process. At this time, the opening section is provided at the color filter 10 so that the color filter 10 is not formed at an area of being formed the contact hole 19.

After that, similar to the first overcoat layer 12 made of acrylic resin and so forth, photoconductive type resist is made to apply by using application method of being obtained even film thickness such as spin coat method, printing method and so forth, to conduct exposure, to conduct development and to conduct baking to form the second overcoat layer 13 as flattened film. After that, in order to form the contact hole 19, the contact hole 19 is formed at the passivation film 9 while removing the passivation film 9 that is exposed at bottom section of the opening section 29 by using photo resist method. Next, the pixel electrode 14 is formed on the second overcoat layer 13 so as to connect to the source electrode 8b through the contact hole 19.

In such a way described above, CF on TFT substrate can be obtained in which film thickness of the overcoat layer of above part of wiring of the drain electrode 8a and the data line 7 and so forth differs from film thickness of the overcoat layer of above part of the color filter 10.

Fourth Embodiment

Figure 9:
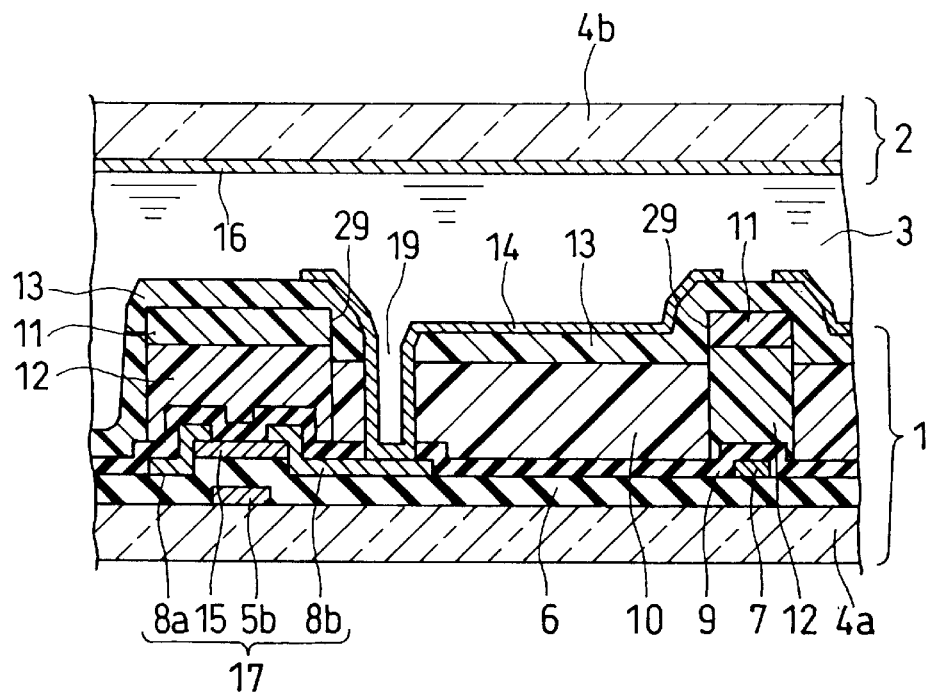
FIG. 9 is a sectional view illustrating structure of liquid crystal display device of a fourth embodiment of the present invention.

Next, an active-matrix type liquid crystal display device and its manufacturing method according to the fourth embodiment of the present invention will be described referring to FIG. 9. FIG. 9 is a sectional view illustrating structure of the liquid crystal display device of the present embodiment. It should be noted that, in the present embodiment, up and down relationship between the black matrix and the first overcoat layer is different in comparison with the above described third embodiment. Accordingly, as for structure and manufacturing method except for the black matrix and the first overcoat layer, it is the same as that of the third embodiment.

As for the liquid crystal display device of the present embodiment, the gate electrode 5b and the gate insulator 6 are formed on the transparent insulative substrate 4a, as well as, the semiconductor layer 15, the drain electrode 8a and the source electrode 8b and the data line 7 are formed on the gate insulator 6. Further, the passivation film 9 is formed so as to cover these elements. The first overcoat layer 12 is provided at corresponding areas to above part of the semiconductor layer 15 and above part of the data line 7 on the passivation film 9, and the opening section 29 is formed at the first overcoat layer 12. The black matrix 11 is formed on the first overcoat layer 12. Similar to the third embodiment, the color filter 10 is formed within the opening section 29 of the first overcoat layer 12. Further, the second overcoat layer 13 is formed so as to cover the first overcoat layer 12 and the color filter 10, and the pixel electrode 14 is formed thereon. The pixel electrode 14 is connected to the source electrode 8b via the contact hole 19. The first and the second overcoat layers are made of photoconductive acrylic resin.

In the present embodiment, similar to the third embodiment, it is possible to maintain distance between the drain electrode 8a and the pixel electrode 14 as distance in which both do not affect with each other. In addition, since the overcoat layer on the color filter 10 is formed by only the second overcoat layer, it is possible to maintain sufficient transmittance while controlling attenuation of back light at the time of action.

Forming method of the CF on TFT substrate of the present embodiment will be indicated below. By the same way as the third embodiment described-above, the gate electrode 5b, the gate insulator 6, the semiconductor layer 15, the drain electrode 8a, the source electrode 8b, the data line 7 and the passivation film 9 are formed on the transparent insulative substrate 4a. After that, photoconductive type resist made of acrylic resin and so forth is made to apply on surface of substrate by using application method of being obtained even film thickness such as spin coat method, printing method and so forth, continuously, to conduct exposure, to conduct development and to conduct baking, whereby, the first overcoat layer 12 having the opening section 29 for accommodating the color filter 10 is formed at corresponding area to above part of the TFT 17 and above part of the data line 7 on the passivation film 9.

After that, the black matrix 11 is formed by using photo resist method. At this time, the first overcoat layer 12 and the black matrix 11 are formed in such a way as to have approximately the same flat pattern, and the opening section 29 is also formed at the black matrix 11.

Next, photoconductive acrylic resin resist is made to apply by using the printing method in the same way as the first overcoat layer 12, to conduct exposure, to conduct development and to conduct baking, whereby, the color filter 10 is formed in such a way as to embed in the opening section 29 of the first overcoat layer 12 and the black matrix 11. At this time, the color filter 10 is not formed at planned area in which the contact hole 19 is formed.

Continuously, similar to the first overcoat layer 12, photoconductive type resist made of acrylic resin and so forth is made to apply by using application method of being obtained even film thickness such as spin coat method or printing method or so forth, to conduct exposure, to conduct development and to conduct baking to form the second overcoat layer 13 as flattened film. At this time, similar to the color filter 10, the second overcoat layer 13 is not formed on planned area in which the contact hole 19 is formed.

After that, the passivation film 9 which is exposed within the opening section 29 is removed selectively by using photo resist method to form the contact hole 19 at the passivation film 9. Then, the pixel electrode 14 connected to the source electrode 8b via the contact hole 19 is formed on the second overcoat layer 13. For this configuration, CF on TET substrate is obtained in which film thickness of the overcoat layer of corresponding area to above part of wiring such as the drain electrode 8a (signal electrode), the data line 7 and so forth is different from film thickness of the overcoat layer of corresponding area to above part of the color filter 10.

Fifth Embodiment

Figure 10:
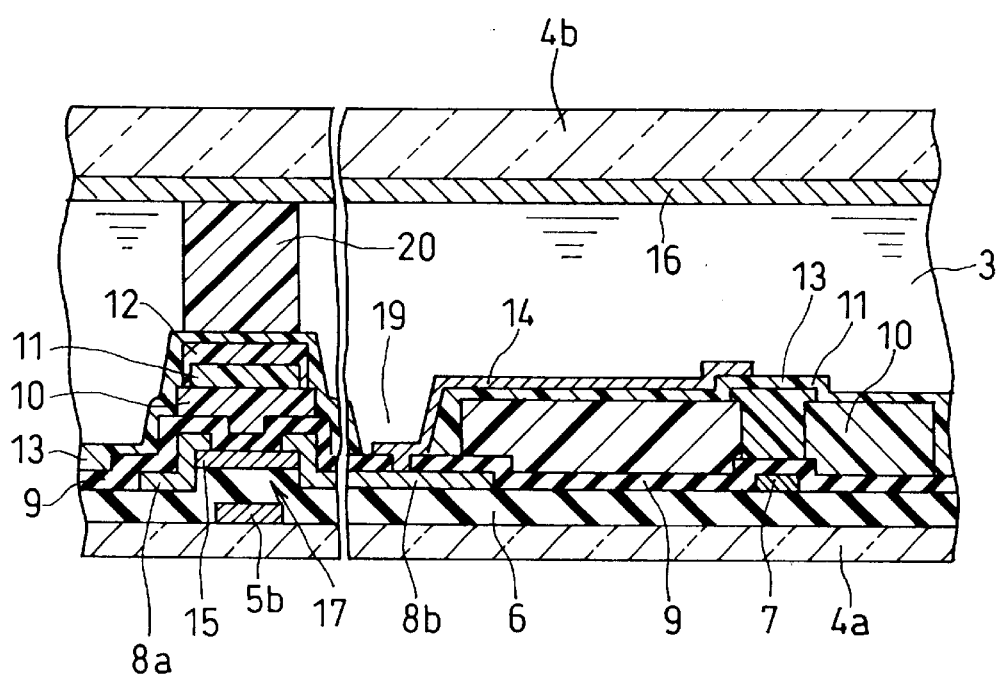
FIG. 10 is a sectional view illustrating structure of liquid crystal display device of a fifth embodiment of the present invention.
Figure 11:
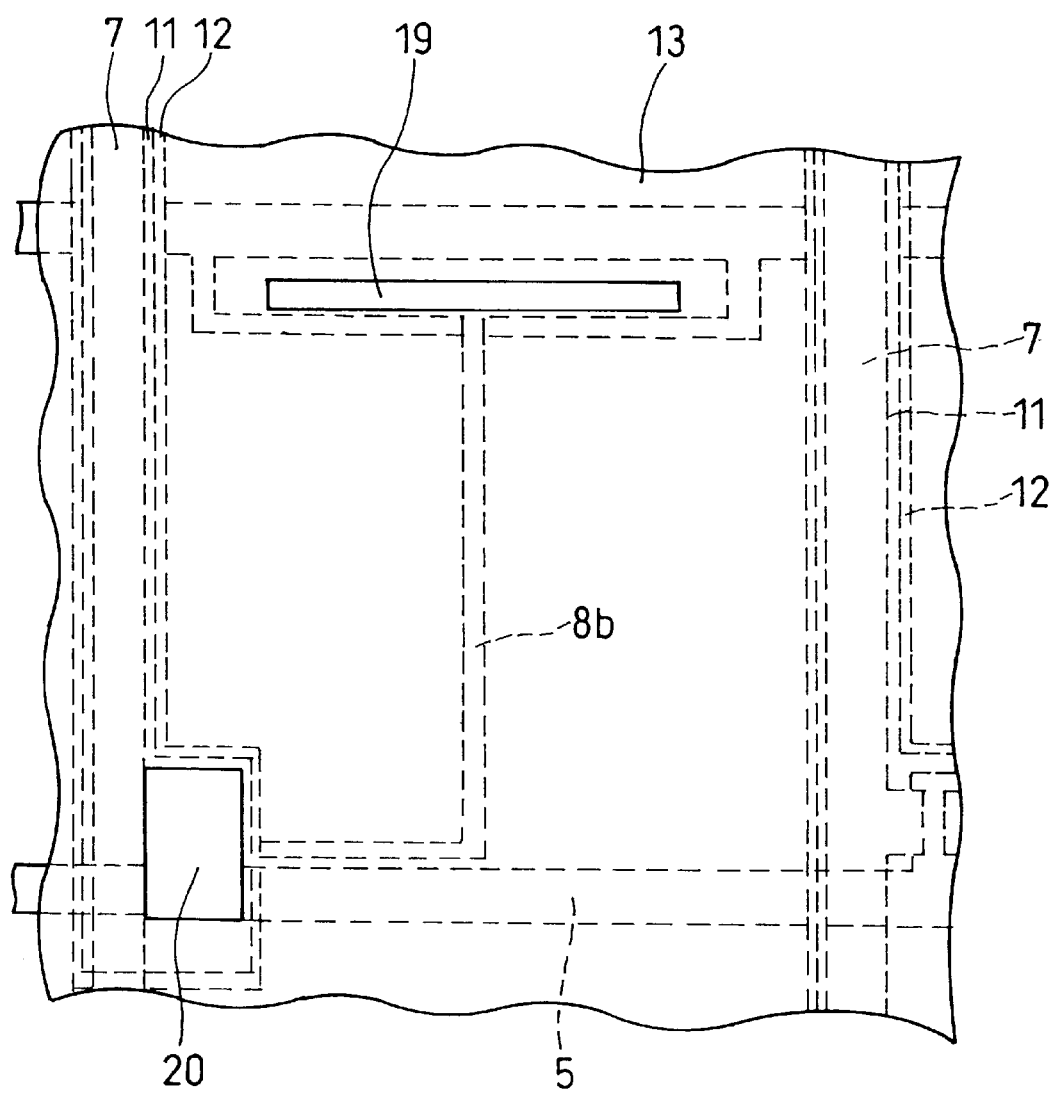
FIG. 11 is a top plan view illustrating position of a spacer in the present embodiment.

Next, an active-matrix type liquid crystal display device and its manufacturing method according to the fifth embodiment of the present invention will be described referring to FIG. 10 and FIG. 11. FIG. 10 is a sectional view illustrating structure of liquid crystal display device, and FIG. 11 is a top plan view illustrating position of spacer for forming gap between substrates. It should be noted that the present embodiment is characterized in that formation of spacer for gap adjustment is made easy while utilizing positively step of creating on the occasion of formation of the first overcoat layer.

Generally, in the liquid crystal display device, in order to maintain interval between the TFT substrate 1 and the opposed substrate 2, usually, gap of degree of 3 to 4.5 μm is formed in such a way as to scatter ball shaped spacer ball. However, when gap is formed while using the spacer ball, unevenness of substrate at part on which the spacer ball is arranged impairs evenness of gap. For that reason, in order to conduct control of the gap accurately, it is effective that columnar spacer is formed by patterning at the predetermined position of the substrate.

In this case, negative type photoconductive acrylic resin and so forth are made to apply with thickness of degree of 3 to 5 μm, to conduct exposure, to conduct development and to conduct baking, whereby, columnar spacer is formed, however, film thickness of applying resin is thick, and particularly when conducting exposure by using g h i combined ray or g h combined ray, it is impossible to execute pattern formation accurately caused by the fact that depth of focus is different according to wavelength of each g ray or i ray, thus shape of the columnar spacer becomes uneven, depending on the circumstances, columnar spacer collapses, so there are some cases that defect occurs in which gap becomes uneven.

On the contrary, in the liquid crystal display device of the present embodiment, as illustrated in FIG. 10, in the same way as the first embodiment and the second embodiment described-above, since the first overcoat layer 12 of thick film is formed at TFT part, TFT part is raised in comparison with the conventional case, thus it is possible to lower height of a columnar spacer 20 of forming on TFT part while utilizing positively step created on TFT by the first overcoat layer 12.

Specifically, since step of 1 to 2 μm is formed on TFT by the first overcoat layer 12, it is possible to control film thickness of resin for forming the columnar spacer 20 into 1 to 2 μm. Accordingly, even though this resin is made to conduct exposure by using g h i combined ray or g h combined ray, it is possible to execute patterning into accurate shape, thus it is possible to prevent defect that the columnar spacer 20 collapses. It should be noted that, in case of structure of the present embodiment, since step of the first overcoat layer 12 is utilized, as illustrated in FIG. 11, the columnar spacer 20 is formed at the position on the TFT 17.

Sixth Embodiment

Figure 12:
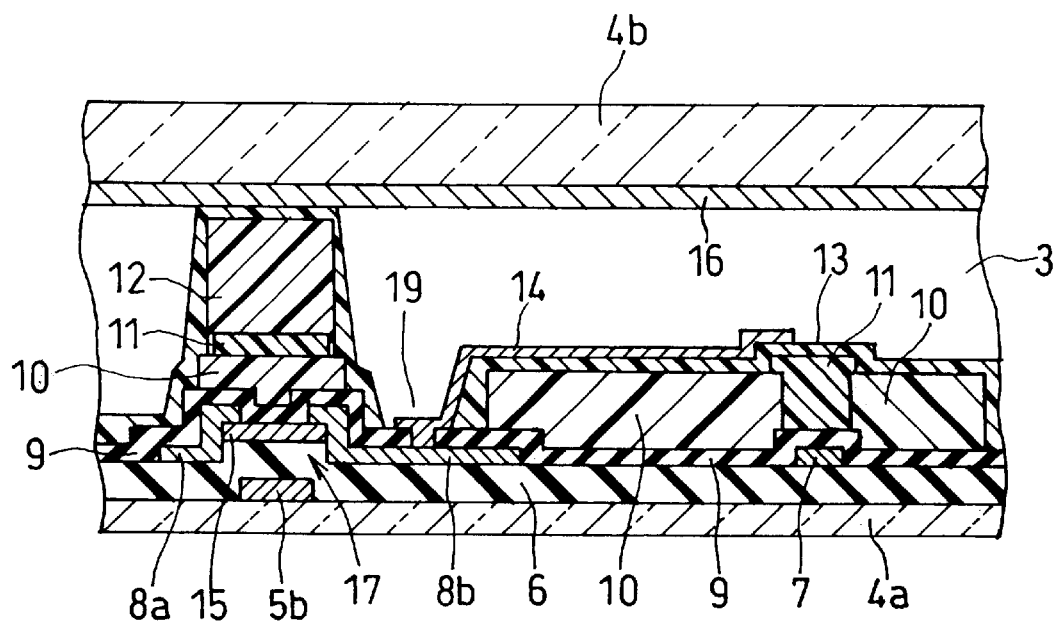
FIG. 12 is a sectional view illustrating structure of liquid crystal display device of a sixth embodiment of the present invention.

Next, an active-matrix type liquid crystal display device and its manufacturing method according to the sixth embodiment of the present invention will be described referring to FIG. 12. FIG. 12 is sectional view illustrating structure of the liquid crystal display device of the present embodiment. The present embodiment forms the first overcoat layer on TFT more thickly, and its TFT part is used as spacer for forming gap, whereby, columnar spacer forming process is made to eliminate, so that simplification of process is executed.

The liquid crystal display device of the present embodiment, in the same way as the second embodiment described-above, switching element such as the TFT 17 and so forth is formed on the transparent insulative substrate 4a, and the color filter 10 and the black matrix 11 are formed thereon via the passivation film 9. Then, the first overcoat layer 12 is formed so as to cover the black matrix 11 on the TFT 17, on this occasion, viscosity of material of acrylic positive type photoconductive resin and so forth of forming the first overcoat layer 12 is increased.

In addition, the second overcoat layer 13 is formed on the passivation film 9, the color filter 10, the black matrix 11 and the first overcoat layer 12. At this time, as illustrated in FIG. 12, thickness of the first overcoat layer 12 is made to adjust so that thickness of adding the first overcoat layer 12 to the second overcoat layer 13 approximately equals to required gap between substrates. For this configuration, on the occasion that the opposed substrate 2 is made to overlap, it is possible to control gap accurately without forming the columnar spacer 20 separately by contacting the second overcoat layer 13 to the opposed substrate 2.

Figure 13:
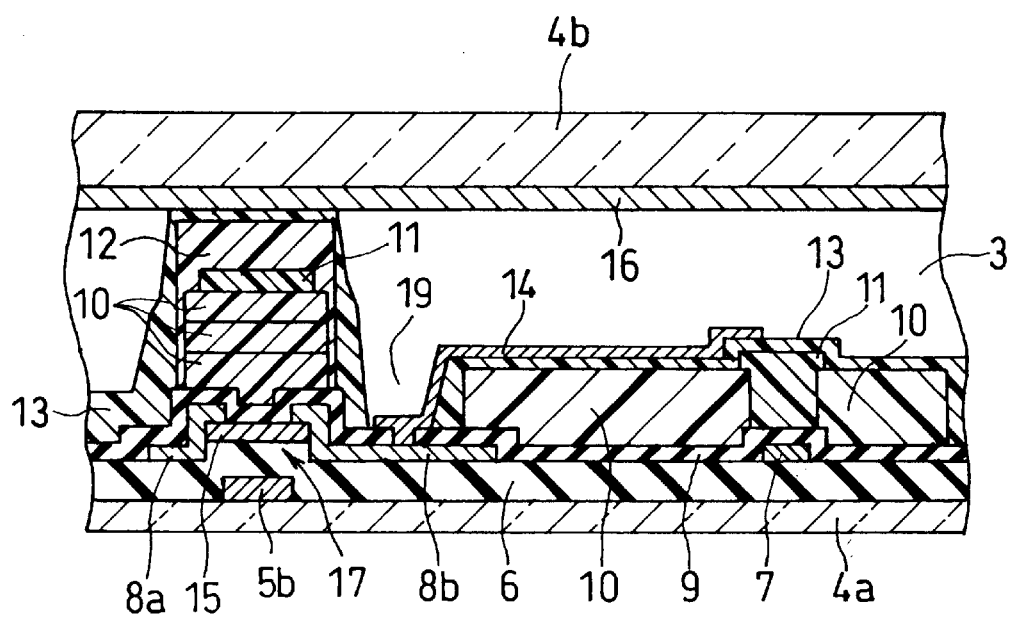
FIG. 13 is a sectional view illustrating structure of liquid crystal display device according to a modified example of the present invention.

FIG. 13 is a sectional view illustrating a configuration of liquid crystal display device according to modified example of the present embodiment. In the liquid crystal display device illustrated in FIG. 12, in order to conduct pattern formation surely of the first overcoat layer 12, it is preferable that film thickness of the first overcoat layer 12 is not so much thickened. Accordingly, in the present modified example, as illustrated in FIG. 13, film thickness of the color filter 10 is made to thicken in such a way as to obtain film thickness while overlapping the color filter 10 with 2 to 3 layers under the black matrix 11, thus film thickness of the first overcoat layer 12 is made to minimize by only corresponding thickness thereto. It should be noted that, in this case, it is preferable that the first overcoat layer 12 protects the color filter 10 in such a way as to be formed to cover side surface of the color filter 10.

Seventh Embodiment

Figure 14:
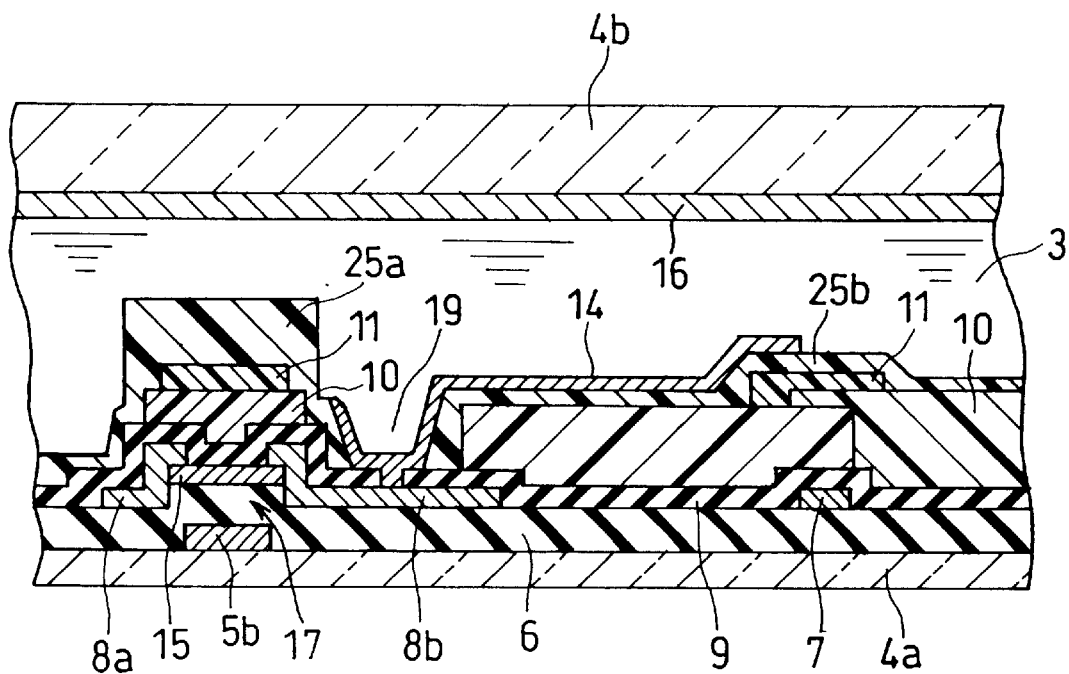
FIG. 14 is a sectional view illustrating structure of liquid crystal display device of a seventh embodiment of the present invention.

Next, an active-matrix type liquid crystal display device and its manufacturing method according to the seventh embodiment of the present invention will be described referring to FIG. 14 and FIG. 15A to FIG. 15E. FIG. 14 is a sectional view illustrating structure of liquid crystal display device of the present embodiment, and FIG. 15A to FIG. 15E are sectional views illustrating manufacturing method in process order. It should be noted that the present embodiment provides manufacturing method in which liquid crystal display device with the same configuration as liquid crystal display device according to the first embodiment described-above is made to manufacture by less process.

Namely, in the first embodiment described-above, since the first overcoat layer 12 and the second overcoat layer 13 are formed separately, respective two times processing such as application of resin, exposure, development and so forth are necessary to conduct. To the contrary, in the present embodiment, in order to plan reduction of number of process, the first overcoat layer 12 and the second overcoat layer 13 are formed integrally in the following manufacturing method. Method thereof will be described below.

Figure 15A:
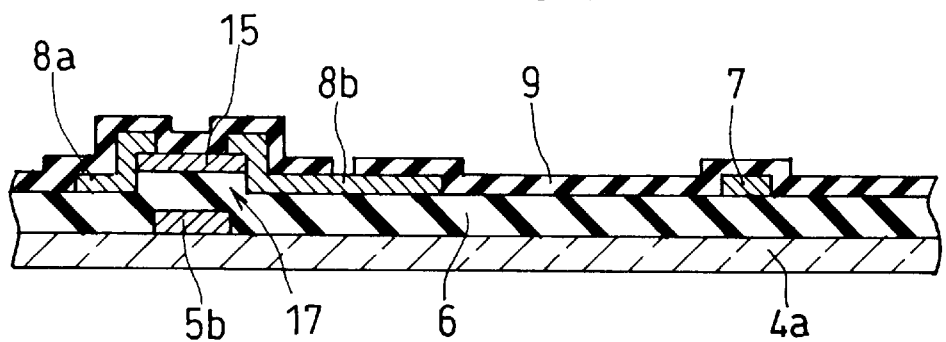
FIG. 15A to FIG. 15E are sectional views illustrating manufacturing method thereof in connection with its process order.
Figure 15B:
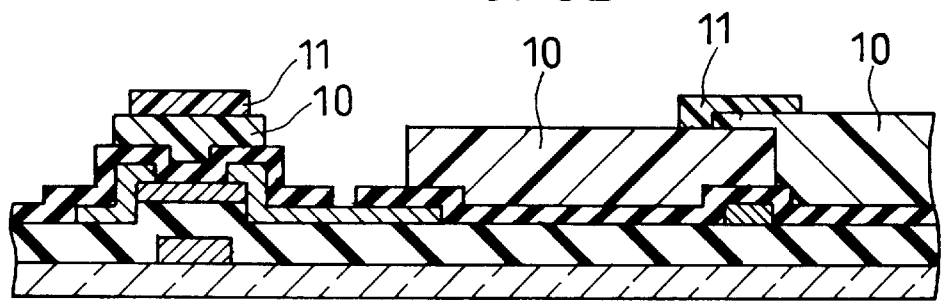

Firstly, as illustrated in FIG. 15A, similar to the first embodiment described-above, switching element such as the TFT 17 and so forth and the data line 7 are formed on the transparent insulative substrate 4a, and the passivation film 9 is formed thereon. Next, as illustrated in FIG. 15B, the color filter 10 is formed selectively on the passivation film 9, and the black matrix 11 is formed at corresponding area to above part of the TFT 17 and at corresponding area to above part of the data line 7 on the color filter 10.

Figure 15C:
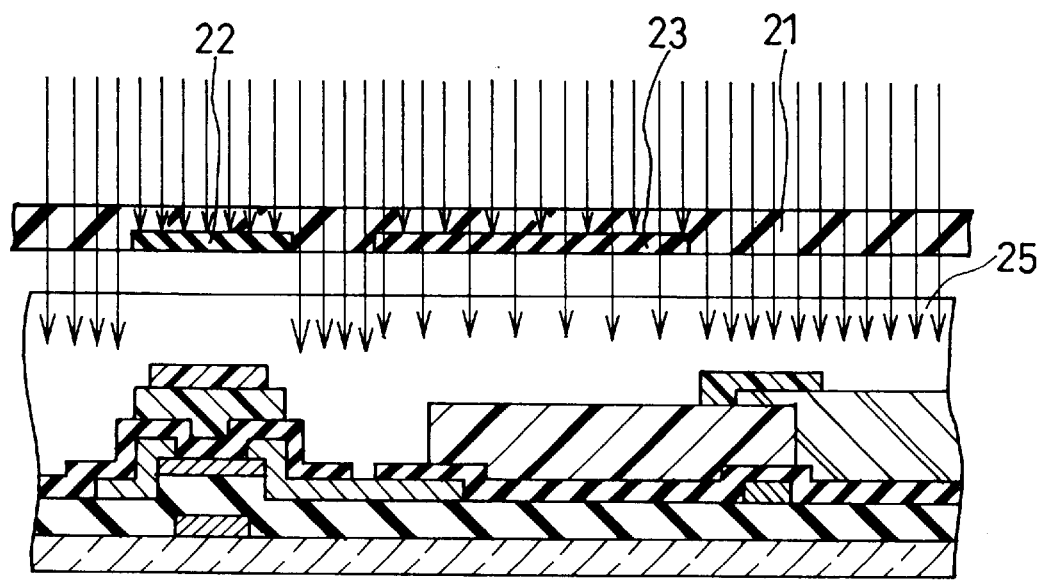

Next, as illustrated in FIG. 15C, an overcoat layer 25 is formed. In the present embodiment, one kind of overcoat layer forms both thick film part and thin film part. For instance, acrylic positive type photoconductive resin with viscosity of degree of 15 cp is made to apply under the number of revolution of degree of 800 rpm/10 s to form positive type photoconductive resin film of film thickness of degree of 1 $\mu$m.

Further, a light shielding film 22 for interrupting light completely is provided at remaining part of an overcoat layer 25a (referring to FIG. 15D) of thick film on a black matrix 11, a diffusion shell 23 is provided at remaining part of an overcoat layer 25b (referring to FIG. 15D) of thin film on the color filter 10 and so forth, and a transparent gray-tone mask 21 is used at part, from which the overcoat layer 25a is removed completely, on contact hole 19 and so forth, so, positive type photoconductive resin film is made to execute exposure. By this configuration, intensity of UV light irradiated to respective parts of this resin film is made to be different to change etching rate of respective parts to developer. As a result, it becomes possible to obtain an overcoat film 25 in which film thickness of respective parts are different from mutually.

Figure 15D:
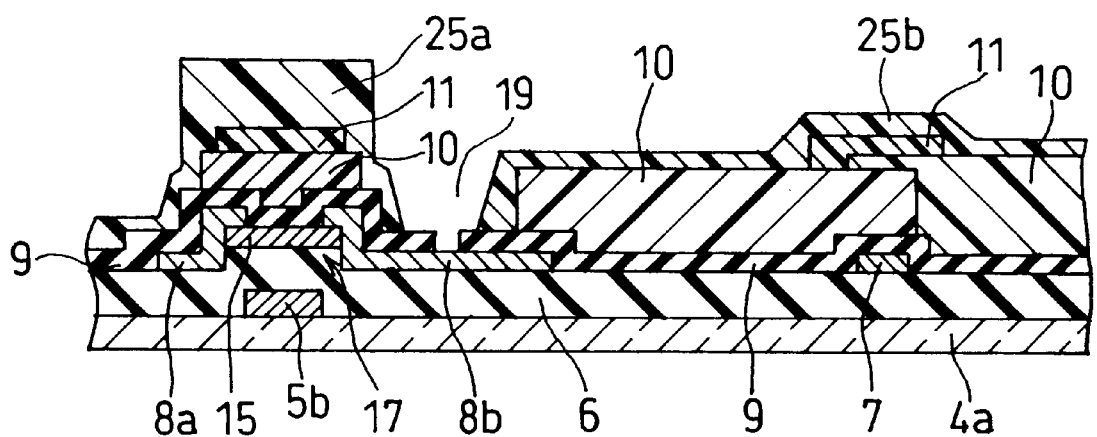
Figure 15E:
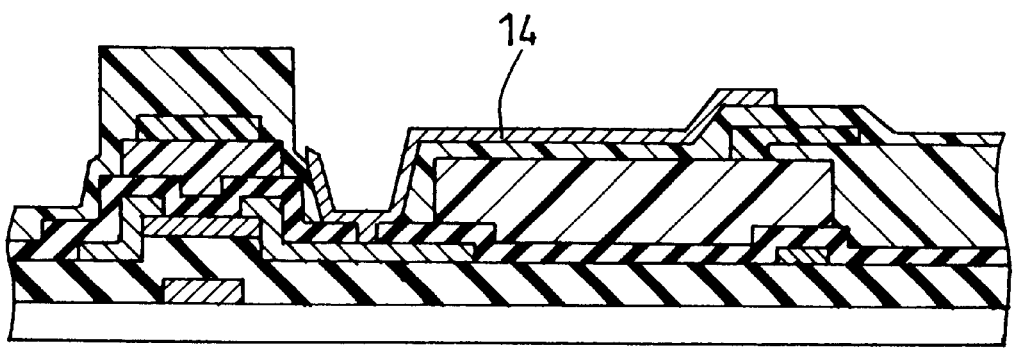

Specifically, transmittance of light in the diffusion shell 23 is taken to be 50%. UV light is made to irradiate 1J toward positive type photoconductive resin film while passing through the gray tone mask 21 containing the diffusion shell 23, after that, development with TMAH 0.4% solution is executed, and baking is executed under the condition that temperature is 220 degrees, and time is 1 hour. As a result, as illustrated in FIG. 15D, film thickness of the overcoat layer 25a on the black matrix 11 becomes approximate 1 $\mu$m, and film thickness of the overcoat layer 25b on the color filter 10 becomes approximate 0.5 $\mu$m. After that, as illustrated in FIG. 15E, the pixel electrode 14 made of ITO and so forth is formed. By this configuration, TFT substrate of the present embodiment is formed. An opposed substrate in which the opposed electrode 16 is formed on the transparent insulative substrate 4b is made to arrange to this TFT substrate oppositely, and liquid crystal is filled up between the TFT substrate and the opposed substrate, so that the liquid crystal display device illustrated in FIG. 14 is formed.

In the present embodiment, as described above, amount of exposure is made to differ mutually according to position while using the gray tone mask 21, whereby, it is possible to form the overcoat layer 25 in such a way that thick overcoat layer is formed on the TFT 17, and thin overcoat layer is formed on the color filter 10 of pixel area by each one time execution of application of resin, exposure and development. For that reason, it is possible to design reduction of the number of process in comparison with above-described respective embodiments. It should be noted that, in the present embodiment, amount of exposure is made to adjust using the gray tone mask 21, however, as another method, exposure is made to execute two times, and at this time, in each exposure, monochrome mask whose patterns are different from each other is used so as to cause amount of exposure of respective parts in resin layer to be different into 3 or 4 gradations, whereby it is possible to form overcoat layer with different film thickness in every part by one time execution of application of overcoat resin and development.

Eighth Embodiment

Figure 16:
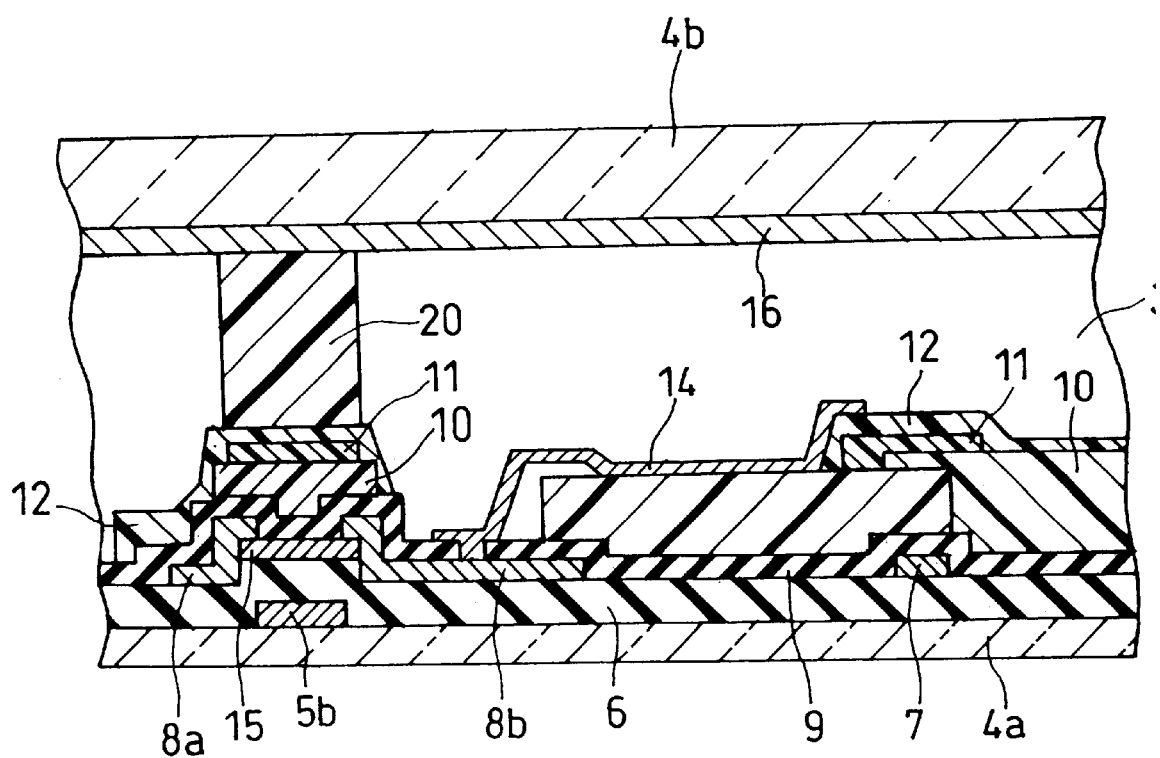
FIG. 16 is a sectional view illustrating structure of liquid crystal display device of an eighth embodiment of the present invention.

Next, an active-matrix type liquid crystal display device and its manufacturing method according to the eighth embodiment of the present invention will be described referring to FIG. 16. FIG. 16 is a sectional view illustrating structure of liquid crystal display device of the present embodiment. The present embodiment is characterized in that the second overcoat layer 13 is eliminated, and the first overcoat layer 12 is only used.

In the present embodiment, in the same way as the first embodiment described-above, the TFT 17 and the data line 7 are formed on the transparent insulative substrate 4a, and the passivation film 9 is formed thereon. In addition, the color filter 10 is formed selectively on the passivation film 9, and the black matrix 11 is formed selectively thereon. Further, photoconductive resin is made to apply thereon, to conduct exposure and to conduct development, whereby the first overcoat layer 12 is formed. At this time, the first overcoat layer 12 is not formed at flat section in surface of the color filter 10 by adjusting amount of exposure and development time, while the first overcoat layer 12 is formed so as to cover the black matrix 11 on the TFT 17 and on the data line 7 and the first overcoat layer 12 is made to remain in step section (TFT 17 section, data line 7 section, edge section of color filter 10). After that, the pixel electrode 14 is formed on the first overcoat layer 12 and the color filter 10.

By this method, since the black matrix 11 is made to protect, and it is possible to leave the first overcoat layer 12 at edge section of the color filter 10, it is possible to prevent disconnection of the pixel electrode 14 without the second overcoat layer 13. By this configuration, it is possible to further improve transmittance of light of TFT substrate. It should be noted that, at this case, the color filter 10 is exposed in the liquid crystal layer 3 through the pixel electrode 14 made of ITO, so, impurity of the color filter 10 is easy to mix with the liquid crystal layer 3, therefore, it becomes necessary to device a plan in which impurity is not dispersed in the liquid crystal layer 3 by thickening film thickness of orientation film and so forth.

It should be noted that, in respective embodiments described-above, description is made about liquid crystal display device of CF on TFT structure, however, the present invention is not restricted by the above-described embodiments, it is possible to apply to structure in which the color filter 10 and the black matrix 11 are formed at the side of opposed substrate.

What is claimed is:

1. An active-matrix type liquid crystal display device comprising:

first and second transparent substrates being arranged opposite to each other;

a plurality of gate lines and data lines formed on a surface of said first transparent substrate being in opposite state to said second transparent substrate, in which the gate lines and the data lines cross mutually;

a thin film transistor, provided at the surface of said first transparent substrate, in which said gate line is connected to its gate electrode and said data line is connected to one of a source/drain electrode of said thin film transistor;

a color filter at least at a pixel area, said pixel area is an area surrounded by said gate line and said data line except for a transistor formation area on which said thin film transistor is formed and a data line formation area on which said data line is formed;

an overcoat layer which is provided in such a way as to cover at least an end section of both said thin film transistor and said color filter, said overcoat layer comprising:
        a thin film part which is formed, at least, on said pixel area, and
        a thick film part which is formed on at least said transistor formation area, a film thickness of the thick film part is thicker than a film thickness of said thin film part;

a pixel electrode which is provided at said pixel area, the pixel electrode is connected to the other of said source/drain electrode;

an opposed electrode which is provided at a surface of said second transparent substrate being in opposite state to said first transparent substrate; and liquid crystal which is provided between said first transparent substrate and said second transparent substrate, wherein said thick film part is formed in such a way as to pile up a plurality of layers, wherein said overcoat layer is formed from a first overcoat layer and a second overcoat layer, in which said thin film part consists of only said second overcoat layer and said thick film part is formed in such a way as to pile said first overcoat layer up said second overcoat layer.

2. The active-matrix type liquid crystal display device according to claim 1, wherein said first overcoat layer has an opening section in said pixel area, said color filter is formed within said opening section, and said second overcoat layer is formed on said first overcoat layer and on said color filter.

3. The active-matrix type liquid crystal display device according to claim 1, further comprising spacers which are provided between convex sections which are formed with both said thin film transistor and said thick film part of overcoat layer contained, and said opposed electrode.

4. The active-matrix type liquid crystal display device according to claim 3, wherein said convex section formed with both said thin film transistor and said thick film part of overcoat layer contained comes into contact with said opposed electrode.

5. An active-matrix type liquid crystal display device comprising:

first and second transparent substrates being arranged opposite to each other;

a plurality of gate lines and data lines formed on a surface of said first transparent substrate being in opposite state to said second transparent substrate, in which the gate lines and the data lines cross mutually;

a thin film transistor, provided at the surface of said first transparent substrate, said gate line is connected to its gate electrode and said data line is connected to one of a source/drain electrode of said thin film transistor;

a color filter at least at a pixel area, said pixel area is an area surrounded by said gate line and said data line except for a transistor formation area on which said thin film transistor is formed and a data line formation area on which said data line is formed;

an overcoat layer which is provided in such a way as to cover at least an end section of both said thin film transistor and said color filter, said overcoat layer comprising:
        a thin film part which is formed, at least, on said pixel area, and
        a thick film part which is formed on at least said transistor formation area, a film thickness of the thick film part is thicker than a film thickness of said thin film part;

a pixel electrode which is provided at said pixel area, in which the pixel electrode is connected to the other of said source/drain electrode;

an opposed electrode which is provided at surface of said second transparent substrate being in opposite state to said first transparent substrate; and liquid crystal which is provided between said first transparent substrate and said second transparent substrate, further comprising black matrix which is formed on at least a part of area except for said pixel area, and said overcoat layer is formed so as to cover said black matrix.

6. The active-matrix type liquid crystal display device according to claim 5, wherein said black matrix is provided at said transistor formation area.

7. The active-matrix type liquid crystal display device according to claim 6, wherein said color filter is provided under said black matrix in said transistor formation area.

8. The active-matrix type liquid crystal display device according to claim 5, wherein said black matrix is provided at said data line formation area.

9. The active-matrix type liquid crystal display device according to claim 8, wherein said color filter is not formed at said data line formation area.

10. A manufacturing method of active-matrix type liquid crystal display device comprising the steps of:

forming a plurality of gate lines and data lines crossed mutually on a surface of a first transparent substrate;

forming a thin film transistor on said surface, a gate electrode of said thin film transistor being connected to said gate line and one of a source/drain electrode of said thin film transistor is connected to said data line;

forming a color filter at least on a pixel area, said pixel area is an area surrounded by said gate line and said data line except for a transistor formation area on which said thin film transistor is formed and a data line formation area on which said data line is formed;

forming an overcoat layer having a thick film part and a thin film part so as to cover at least an end section of both said thin film transistor and said color filter, said thin film part being arranged on at least said pixel area and said thick film part whose film thickness is thicker than a film thickness of said thin film part is arranged on at least said transistor formation area;

forming a pixel electrode connected to the other of said source/drain electrode on said pixel area;

forming an opposed electrode on a surface of a second transparent substrate;

arranging said first transparent substrate and said second transparent substrate so that said surface of said first transparent substrate on which said thin film transistor is formed and said surface of said second transparent substrate on which said opposed electrode is formed are opposed each other; and filling liquid crystal between said first transparent substrate and said second transparent substrate, wherein the step of forming said overcoat layer has the step of forming successively a plurality of layers, and said thick film part is formed in such a way as to pile up more layers than said thin film part, wherein the step of forming said overcoat layer comprises the steps of:

forming a first overcoat layer only on said thick film part; and forming a second overcoat layer both on said thick film part and on said thin film part.

11. The manufacturing method of active-matrix type liquid crystal display device according to claim 10, wherein each of the steps of forming said first overcoat layer and forming said second overcoat layer comprises the steps of:

forming an application film while applying application material by using spin application method; and conducting patterning of said application film, in which the viscosity of application material of forming said second overcoat layer is lower than that of application material of forming said first overcoat layer.

12. The manufacturing method of active-matrix type liquid crystal display device according to claim 10, wherein each of the steps of forming said first overcoat layer and forming said second overcoat layer comprises the steps of:

forming an application film while applying application material by using a spin application method; and conducting patterning of the application film, in which a number of spin revolutions in the process for forming said second overcoat layer is greater than a number of spin revolutions in the process for forming said first overcoat layer.

13. The manufacturing method of active-matrix type liquid crystal display device according to claim 10, further comprising the step of forming spacers between a convex section formed with both said thin film transistor and thick film part of said overcoat layer contained, and said opposed electrode.

14. The manufacturing method of active-matrix type liquid crystal display device according to claim 10, wherein, in the step of arranging said first transparent substrate and said second transparent substrate so that a surface of said first transparent substrate on which said thin film transistor is formed and a surface of said second transparent substrate on which said opposed electrode is formed are opposed each other, a convex section formed with both said thin film transistor and said thick film part of said overcoat layer contained is made to contact to said opposed electrode.

15. The manufacturing method of active-matrix type liquid crystal display device according to claim 10, further comprising the step of forming a black matrix on at least a part of area except for said pixel area, in which said overcoat layer is formed in such a way as to cover said black matrix.

16. The manufacturing method of active-matrix type liquid crystal display device according to claim 15, wherein said black matrix is formed on said transistor formation area.

17. The manufacturing method of active-matrix type liquid crystal display device according to claim 16, wherein said color filter is formed under said black matrix in said transistor formation area.

18. The manufacturing method of active-matrix type liquid crystal display device according to claim 15, wherein said black matrix is formed on said data line formation area.

19. The manufacturing method of active-matrix type liquid crystal display device according to claim 18, wherein said color filter is not formed on said data line formation area.

20. A manufacturing method of active-matrix type liquid crystal display device comprising the steps of:

forming a plurality of gate lines and data lines crossed mutually on a surface of a first transparent substrate;

forming a thin film transistor on said surface, in which its gate electrode is connected to said gate line and one of its source/drain electrode is connected to said data line;

forming a color filter at least on a pixel area, said pixel area is an area surrounded by said gate line and said data line except for a transistor formation area on which said thin film transistor is formed and a data line formation area on which said data line is formed;

forming an overcoat layer having a thin film part and a thick film part so as to cover at least an end section of both said thin film transistor and said color filter, said thin film part is arranged on at least said pixel area and said thick film part whose film thickness is thicker than a film thickness of said thin film part is arranged on at least said transistor formation area;

forming a pixel electrode connected to the other of said source/drain electrode on said pixel area;

forming an opposed electrode on surface of a second transparent substrate;

arranging said first transparent substrate and said second transparent substrate so that said surface of said first transparent substrate on which said thin film transistor is formed and said surface of said second transparent substrate on which said opposed electrode is formed are opposed each other; and filling liquid crystal between said first transparent substrate and said second transparent substrate, wherein the step of forming said overcoat layer comprises the steps of:

forming an application layer;

executing exposure of said application layer in such a way that amount of exposure is made to differ in every part; and executing patterning of said application layer in such a way as to remove said application layer selectively while executing development of said application layer and for forming thick film part and thin film part.

21. The manufacturing method of active-matrix type liquid crystal display device according to claim 20, wherein the step of executing exposure of said application layer is such that an amount of exposure is made to differ in every part while using masks having a light shielding section, a half-transmission section, and a transmission section.

* * * * *